(12) United States Patent
Harvill et al.

(10) Patent No.: US 9,213,920 B2
(45) Date of Patent: Dec. 15, 2015

(54) USING INFRARED IMAGING TO CREATE DIGITAL IMAGES FOR USE IN PRODUCT CUSTOMIZATION

(71) Applicant: ZAZZLE.COM, INC, Redwood City, CA (US)

(72) Inventors: Young Harvill, El Granada, CA (US); Robert I. Beaver, III, San Francisco, CA (US); Jeffrey J. Beaver, San Francisco, CA (US)

(73) Assignee: Zazzle.com, Inc., Redwood City, CA (US)

( * ) Notice: Subject to any disclaimer, the term of this patent is extended or adjusted under 35 U.S.C. 154(b) by 47 days.

(21) Appl. No.: 13/736,844

(22) Filed: Jan. 8, 2013

(65) Prior Publication Data
US 2014/0193068 A1    Jul. 10, 2014

(51) Int. Cl.
*G06K 9/40* (2006.01)
*G06K 9/78* (2006.01)
*H04N 1/387* (2006.01)
(Continued)

(52) U.S. Cl.
CPC .............. *G06K 9/78* (2013.01); *G06T 7/0081* (2013.01); *G06T 11/00* (2013.01); *G09G 5/36* (2013.01); *H04N 1/387* (2013.01); *H04N 5/23206* (2013.01); *H04N 5/23229* (2013.01); *H04N 5/332* (2013.01); *H04N 9/045* (2013.01); *G06T 2207/10024* (2013.01); *G06T 2207/10048* (2013.01); *G09G 2320/0693* (2013.01)

(58) Field of Classification Search
CPC ......... G06F 3/013; G06F 3/005; G06F 3/011; G02B 2027/0138; G02B 2027/0134
USPC .......................... 382/162, 164, 167, 284, 274
See application file for complete search history.

(56) References Cited

U.S. PATENT DOCUMENTS 5,039,132 A    8/1991    Anderson
5,615,123 A    3/1997    Davidson et al.
(Continued)

FOREIGN PATENT DOCUMENTS

EP    1 365 358 A2    11/2003
JP    2001-521659 A    11/2001
(Continued)

OTHER PUBLICATIONS

Australian Government IP Australia, "Patent Examination Report No. 1", application No. 2011202173, dated Jan. 30, 2014, 3 pages.
(Continued)

*Primary Examiner* — Ali Bayat
(74) *Attorney, Agent, or Firm* — Hickman Palermo Becker Bingham LLP

(57) ABSTRACT

Techniques for using infrared imaging to create digital images for use in product customization are described. In an embodiment, an infrared photograph of a product with imprinted markup is received and a visible light photograph of the product with the imprinted markup is received. The imprinted markup is visible in the visible light photograph but is not visible in the infrared photograph. Instructions for rendering a customization image of the product depicting a particular customization are determined based in part on the infrared photograph and visible light photograph, where the particular customization is not in the infrared photograph or the visible light photograph.

26 Claims, 17 Drawing Sheets
(7 of 17 Drawing Sheet(s) Filed in Color)

(51) Int. Cl.

| | |
|---|---|
| G09G 5/36 | (2006.01) |
| H04N 5/232 | (2006.01) |
| H04N 5/33 | (2006.01) |
| H04N 9/04 | (2006.01) |
| G06T 11/00 | (2006.01) |
| G06T 7/00 | (2006.01) |

(56) References Cited

U.S. PATENT DOCUMENTS

| | | | |
|---|---|---|---|
| 5,764,308 | A | 6/1998 | Lee |
| 6,591,011 | B1 | 7/2003 | Nielsen |
| 7,262,778 | B1 | 8/2007 | Edwards et al. |
| 8,023,746 | B2 | 9/2011 | Ackley et al. |
| 8,090,461 | B2 | 1/2012 | Ohiaeri et al. |
| 8,174,521 | B2 | 5/2012 | Harvill et al. |
| 8,184,124 | B2 | 5/2012 | Edwards et al. |
| 8,787,707 | B1 * | 7/2014 | Steves et al. ............ 382/321 |
| 2001/0034668 | A1 | 10/2001 | Whitworth |
| 2002/0068141 | A1 | 6/2002 | Pieper et al. |
| 2003/0080978 | A1 | 5/2003 | Navab et al. |
| 2004/0017595 | A1 | 1/2004 | Ikeda |
| 2004/0169892 | A1 | 9/2004 | Yoda |
| 2005/0226498 | A1 | 10/2005 | Lee |
| 2005/0276444 | A1 | 12/2005 | Zhou et al. |
| 2006/0197775 | A1 | 9/2006 | Neal |
| 2007/0067179 | A1 | 3/2007 | Kerr et al. |
| 2007/0098234 | A1 | 5/2007 | Fiala |
| 2007/0124215 | A1 | 5/2007 | Simmons |
| 2007/0143082 | A1 | 6/2007 | Degnan |
| 2008/0069451 | A1 | 3/2008 | Ikeda |
| 2008/0117305 | A1 | 5/2008 | Rogers et al. |
| 2008/0247674 | A1 | 10/2008 | Walch |
| 2008/0285854 | A1 | 11/2008 | Kotake et al. |
| 2009/0080773 | A1 | 3/2009 | Shaw et al. |
| 2009/0109214 | A1 | 4/2009 | Harvill et al. |
| 2009/0122329 | A1 | 5/2009 | Hegemier et al. |
| 2009/0195538 | A1 | 8/2009 | Ryu et al. |
| 2009/0289955 | A1 | 11/2009 | Douris et al. |
| 2009/0324100 | A1 | 12/2009 | Kletter et al. |
| 2010/0036753 | A1 | 2/2010 | Harvill et al. |
| 2010/0048290 | A1 | 2/2010 | Baseley et al. |
| 2010/0066750 | A1 | 3/2010 | Yu et al. |
| 2010/0092079 | A1 | 4/2010 | Aller |
| 2010/0106283 | A1 | 4/2010 | Harvill et al. |
| 2010/0185309 | A1 | 7/2010 | Ohiaeri et al. |
| 2010/0185529 | A1 | 7/2010 | Chesnut et al. |
| 2010/0189316 | A1 | 7/2010 | Walch |
| 2010/0238166 | A1 | 9/2010 | Tamstorf et al. |
| 2010/0287511 | A1 | 11/2010 | Meier et al. |
| 2011/0280447 | A1 | 11/2011 | Conwell |
| 2011/0292451 | A1 | 12/2011 | Harvill |
| 2011/0305368 | A1 | 12/2011 | Osako |
| 2012/0218300 | A1 | 8/2012 | Hayakawa |
| 2012/0262584 | A1 * | 10/2012 | Strandemar ............ 348/164 |
| 2013/0229482 | A1 * | 9/2013 | Vilcovsky et al. ...... 348/14.07 |
| 2014/0160118 | A1 | 6/2014 | Beaver, III et al. |
| 2014/0270506 | A1 | 9/2014 | Harvill et al. |

FOREIGN PATENT DOCUMENTS

| | | |
|---|---|---|
| JP | 2003-264740 | 6/2003 |
| JP | 2007-257176 | 10/2007 |
| JP | 2010-117870 | 5/2010 |
| JP | 2010-231529 | 10/2010 |
| JP | 2010-287174 A | 12/2010 |
| WO | WO 98/47106 | 10/1998 |
| WO | WO 2009/055738 A1 | 4/2009 |
| WO | WO2009/094724 A1 | 8/2009 |
| WO | WO 2009/094724 A1 | 8/2009 |
| WO | WO 2010/022404 A1 | 2/2010 |

OTHER PUBLICATIONS

Current Claims in application No. 2011202173, dated Jan. 2014, 5 pages.

Soltani et al., "Using Augmented-Reality on Planar Surfaces for Previewing Décor Changes", Stanford University EE368 Class Project Spring 2010, 5 pages.

Schalkoff R.J., "Syntactic Pattern Recognition (Syntrp) Overview", dated Jan. 1, 1992, Pattern Recognition: Structural, Structural and Neural Approaches, 68 pages.

Rosin, Paul, "Training Cellular Automata for Image Processing", SCIA dated 2005, LNCS, 10 pages.

Rekimoto, Jun, "Matrix: a Realtime Object Identification and Registration Method for Augmented Reality", Computer Human Interaction, dated Jul. 15-17, 1998, 6 pages.

Lee et al., "Real-time Color Correction for Marker-based Augmented Reality Applications", International Workshop on Ubiquitos VR, dated 2009, 4 pages.

Choudary et al, "March: Mobile Augmented Reality for Cultural Heritage", MM 2009, dated Oct. 19-24, 2009, Beijing China, 2 pages.

H.D. Cheng, X.H. Jiang, Y. Sun, J. Wang (2001). "Color image segmentation: advances and prospects". Pattern Recognion. vol. 34, No. 12, pp. 2259-2281.

L. Vincent and P. Soille, "Watersheds in Digital Spaces: An Efficient Algorithm Based on Immersion Simulations," IEEE Trans. on PAMI. vol. 13, No. 6. Jun. 1991.

S. Ji, H.W. Park, Image segmentation of color image based on region coherency, IEEE International Conference on Image Processing, 1998, pp. 80}83.

Feng Jing; Mingjing Li; Hong-Jiang Zhang; Bo Zhang; , "Unsupervised image segmentation using local homogeneity analysis," Circuits and Systems, 2003. ISCAS '03. Proceedings of the 2003 International Symposium on , vol. 2, No., pp. II-456-II-459 vol. 2, May 25-28, 2003.

S. Beucher and C. Lantutejoul, "Use of watersheds in contour detection," in Proc. Int. Workshop Image Processing, Real-Time Edge and Motion Detection/Estimation, Rennes, France, Sep. 17-21, 1979.

Yanmin Peng; Rong Liu; , "Object segmentation based on watershed and graph cut," Image and Signal Processing (CISP), 2010 3rd International Congress on , vol. 3, No., pp. 1431-1435, Oct. 16-18, 2010.

Yuqian Zhao; Jianxin Liu; Huifen Li; Guiyuan Li; , "Improved watershed algorithm for dowels image segmentation," Intelligent Control and Automation, 2008. WCICA 2008. 7th World Congress on , vol., No., pp. 7644-7648, Jun. 25-27, 2008.

Shengcai Peng; Lixu Gu; , "A Novel Implementation of Watershed Transform Using Multi-Degree Immersion Simulation," Engineering in Medicine and Biology Society, 2005. IEEE-EMBS 2005. 27th Annual International Conference of the , vol., No., pp. 1754-1757, Jan. 17-18, 2006.

T Jos B.T.M. Roerdink, Arnold Meijster,"The Watershed Transform: Definitions, Algorithms and Parallelization Strategies" Fundamenta Informaticae vol. 41 pp. 187-228 2001.

Claude Kauffman; Nicolas Piche, "A Cellular Automaton for Ultra-Fast Watershed Transform on GPU," ICPR, p. 1-4. IEEE, (2008).

Sheng Chen; Zhanfeng Shen; Jiancheng Lu; Lijing Gao, "A Fast Watershed-based Image Segmentation Algorithm Using Local Merging Strategy," IEEE (Jan. 21, 2008).

"AR tool lets you bring home a virtual Sony Bravia" dated Aug. 29, 2011 (1 page).

Schalkoff R. J., "Syntactic Pattern Recognition (Syntrp) Overview", Pattern Recognition: Statistical, Structural ad Neural Approaches, Wiley, 68 pages, Jan. 1992.

European Patent Office, "Office Action", in application No. 12181208.5-1238, dated Dec. 6, 2012, 7 pages.

Current Claims in application No. 12181208.5-1238, dated Dec. 2012, 4 pages.

Hirokazu Kato and Mark Billnghurst. "ARToolkit User Manual", Human Interface Technology Lab, University of Washington, dated 2000, 44 pages.

Hirokazu Kato and Mark Billinghurst. "Marker Tracking and HMD Calibration for a Videobased Augmented Reality Conferencing System", In Proceedings of the 2nd International, Workshop on Augmented Reality (IWAR 1999), San Francisco, USA Dated Oct. 1999, 10 pages.

Mark Fiala, "Artag, A Fiducial Marker System Using Digital Techniques", In CVRP '05: Proceedings of the 2005 IEEE Computer

(56) References Cited

OTHER PUBLICATIONS

Society Conference on Computer vision and Pattern Recognition (CVPR) 2:590-596. IEEE Computer Society, dated 2005, 7 pages.
Ryan A. Beasley, "Semiautonomous Medical Image Segmentation Using Seeded Cellular Automation Plus Edge Detector", International Scholarly Research Network ISRN Signal Processing Volume, dated 2012, Article ID 914232, 9 pages.
Daniel Wagner, Tobias Langlotz, and Dieter Schmalstieg, "Robust and Unobtrusive Marker Tracking on Mobile Phones", In ISMAR '08: Proceedings of the $7^{th}$ IEEE/ACM International Symposium on Mixed and Augmented Reality, Washington, DC, USA, Dated 2008, IEEE Computer Society, 4 pages.
Johannes Kohler, Alain Pagani, and Didier Stricker, "Detection and Identification Techniques for Markers Used in Computer Vision", Digital Object Identifier 10.4230/OASics. VLUDS.2010.36, dated 2010, 9 pages.
Homayoun Bagherinia O Roberto Manduchi, "Robust Real-Time Detection of Multi-Color Markers on a Cell Phone", J Real-Time Image Proc., Dated Jun. 3, 2011, 17 pages.
Jun Rekimoto, "Matrix: A Realtime Object Identication and Registration Method for Augmented Reality", Computer Human Interaction, Dated 1998, Proceedings, $3^{rd}$ Asia Pacific, Jul. 15-17, 1998, 6 pages.
Jun Rekimoto and Yuji Ayatsuka, "CyberCode: Designing Augmented Reality Environments with Visual Tags", Proceedings of DARE 2000 on Designing, Dated Apr. 2000, 10 pages.
Martin Hirzer, "Marker Detection for Augmented Reality Applications", Graz University of Technology, Austria, Dated Oct. 27, 2008, 27 pages.
W. Lee and W. Woo, "Real-time Color Correction for Marker-Based Augmented Reality Applications", International Workshop on Ubiquitous VR (IWUVR2009), dated 2009, 4 pages.
Nima Soltani, Mehmet Yilmax, "Using Augmented-Reality on Planar Surfaced for Previewing Décor Changes", Stanford University EE368 Class Project Spring, dated 2010, 5 pages.
Pantida Patirupanusara, "Marker-Based Augmented Reality Magic Book for Anatomical Education", International Conference on Computer and Communication Technologies (ICCCT'2012) May 26-27, 2012, Phuket, 3 pages.
Paul L. Rosin, "Training Cellular Automata for Image Processing", SCIA 2005, LNCS 3540, dated 2005, 10 pages.
Omar Choudary, Vincent Charvillat, Romulus Grigoras, and Pierre Gurdjos, "MARCH: Mobile Augmented Reality for Cultural Heritage", MM'09, Dated Oct. 19-24, 2009, Beijing, China, 2 pages.
Pakemon AR Marker in Sep. 2001 (http://pokemasters.net/forums/showthread.php?t=24845) 17 pages.
Schalkoff R. J., "Syntactic Pattern Recognition (Syntrp) Overview", Pattern Recognition: Statistical, Structural ad Neural Approaches, Wiley, 68 pages.
Japan Patent Office, "Notice of Grounds for Rejection" in application No. 2012-191111, dated Mar. 11, 2014, 4 pages.
European Patent Office, "Search Report" in application No. 14150370.6-1902, dated Apr. 3, 2014, 7 pages.
Ehara et al., "Texture Overlay for Virtual Clothing Based on PCA of Silhouettes", IEEE, dated 2006, 4 pages.
Current Claims in Japan application No. 2012-191111, dated Mar. 2014, 4 pages.
Current Claims in application No. 14150370.6-1902, dated Apr. 3, 2014, 4 pages.
Zhang et al., "Visual Marker Detection and Decoding in AR Systems: A Comparative Study", IEEE, dated 2002, 10 pages.
Schalfoff R, J:, "Syntactic Pattern Recognition SYNTPR Overview" Pattern Recognition Statistical, Structural and Neural Approaches, dated Jan. 1, 1992, 68 pages.
European Patent Office, "Search Report" in application No. 12 181 208.5-1955, dated Feb. 26, 2015, 5 pages.
European Claims in application No. 12 181 208.5-1955, dated Feb. 2015, 4 pages.
X. Zhang et al., Visual Marker Detection and Decoding in AR Systems: A Comparative Study, IEEE, ACM, dated Sep. 2002, pp. 97-106.
Tremeau et al., "A Region Growing and Merging Algotithm to Color Segementation" Pattern Recognition, Elsevier, vol. 30, No. 7, dated Jul. 1, 1997, 13 pages.
Hilsmann Anna et al., "Tracking and Retexturing Cloth for Real-Time Virtual Clothing Applications", dated May 4, 2009, 12 pages.
European Patent Office, "Search Report"in application No. 14159664.3-1906, dated Oct. 1, 2014, 7 pages.
Claims in European Application No. 1415966.3-1906, dated Oct. 2014, 4 pages.
Cardone A. et al., A Survey of Shape Similarity Assessment Algorithms for Product Design and Manufacturing Applications, J Comput Inf. Science Eng 3:109-118, dated 2003.

\* cited by examiner

Fig. 8  
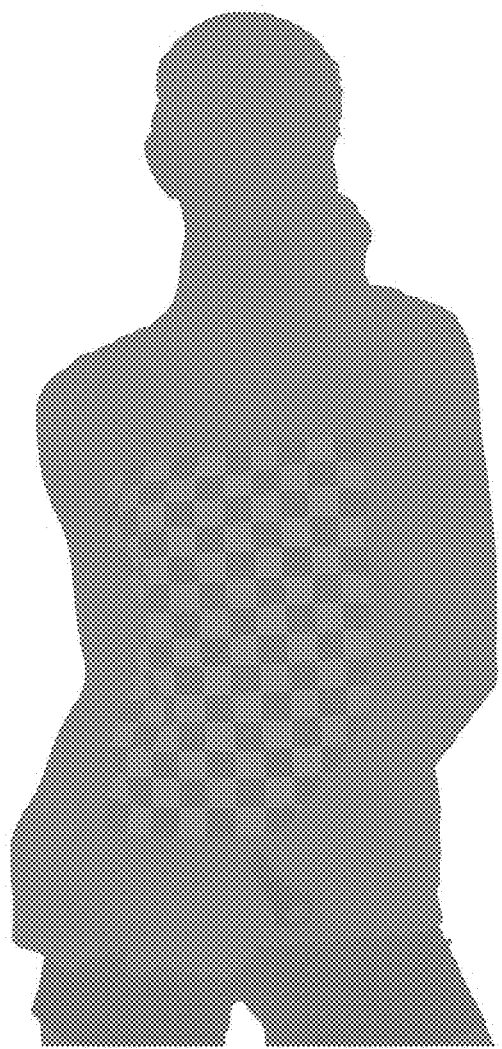

1102

USING INFRARED IMAGING TO CREATE DIGITAL IMAGES FOR USE IN PRODUCT CUSTOMIZATION

CROSS-REFERENCE TO RELATED APPLICATIONS AND PATENTS

The present application is related to (1) application Ser. No. 13/342,103, filed Jan. 1, 2012, entitled "Product Customization System And Method", (2) U.S. Pat. No. 8,090,461, filed Aug. 24, 2009, entitled "Product Customization System And Method", (3) U.S. Pat. No. 8,175,931, filed Jul. 29, 2009, entitled "Product Customization System And Method", (4) U.S. Pat. No. 8,174,521, filed Oct. 26, 2007, entitled "Product Modeling System And Method", and (5) application Ser. No. 12/790,711, filed May 28, 2010, entitled "Product Customization System And Method". The contents of all patent applications and patents cited in this paragraph are incorporated by reference.

TECHNICAL FIELD

The present disclosure relates to techniques for image capture and analysis to determine instructions for the automatic rendering of customization images that accurately depict product customizations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Customized goods are highly appealing to consumers who wish to obtain unique and personalized products. Many such consumers browse and order customized goods remotely, for example through a web site that displays product images depicting the products for sale.

Using such a website, a customer may specify a how a product is to be customized, for example, by uploading or specifying patterns, images, or text and customizing the arrangement of such patterns, images, or text. Both customers and on-line retailers would benefit if a customization image could be generated in real-time, which depicts a product as customized according to the customer's specified customization, and be displayed to the customer in response to receiving the customer's customization.

One approach for generating such a customization image would be to simply overlay an image of the customer-specified customization on an image of a non-customized product. However, such an image would not be an accurate depiction of a three-dimensional product because the customization image would not depict the natural contours of such a product. The customer-uploaded image, design, or text would be a flat image, lacking the shading of a contoured image, or at least lacking shading that matches the contours of the non-customized product image.

What is needed is an approach for the automatic rendering of a product customization image, which depicts a customized product as it would actually appear. Customer service in websites of this type is also improved when customers can view a sequence of images of a customized product as a three-dimensional rendering that is capable of rotation and viewing from different angles. To support 3D viewing of products to be custom manufactured, typically a sample product is photographed approximately simultaneously from different angles and the resulting images are combined into a 3D model. Existing systems cannot capture, with enough speed, efficiency and/or accuracy, a set of images for use in rendering a 3D model while concurrently obtaining sufficient information to accurately represent a customized pattern, image or text in the 3D model in order to provide a customer with a view of how the custom-manufactured product will ultimately appear.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings:

FIG. 8 illustrates an example color segmented image.

DESCRIPTION OF EXAMPLE EMBODIMENTS

Figure 1:
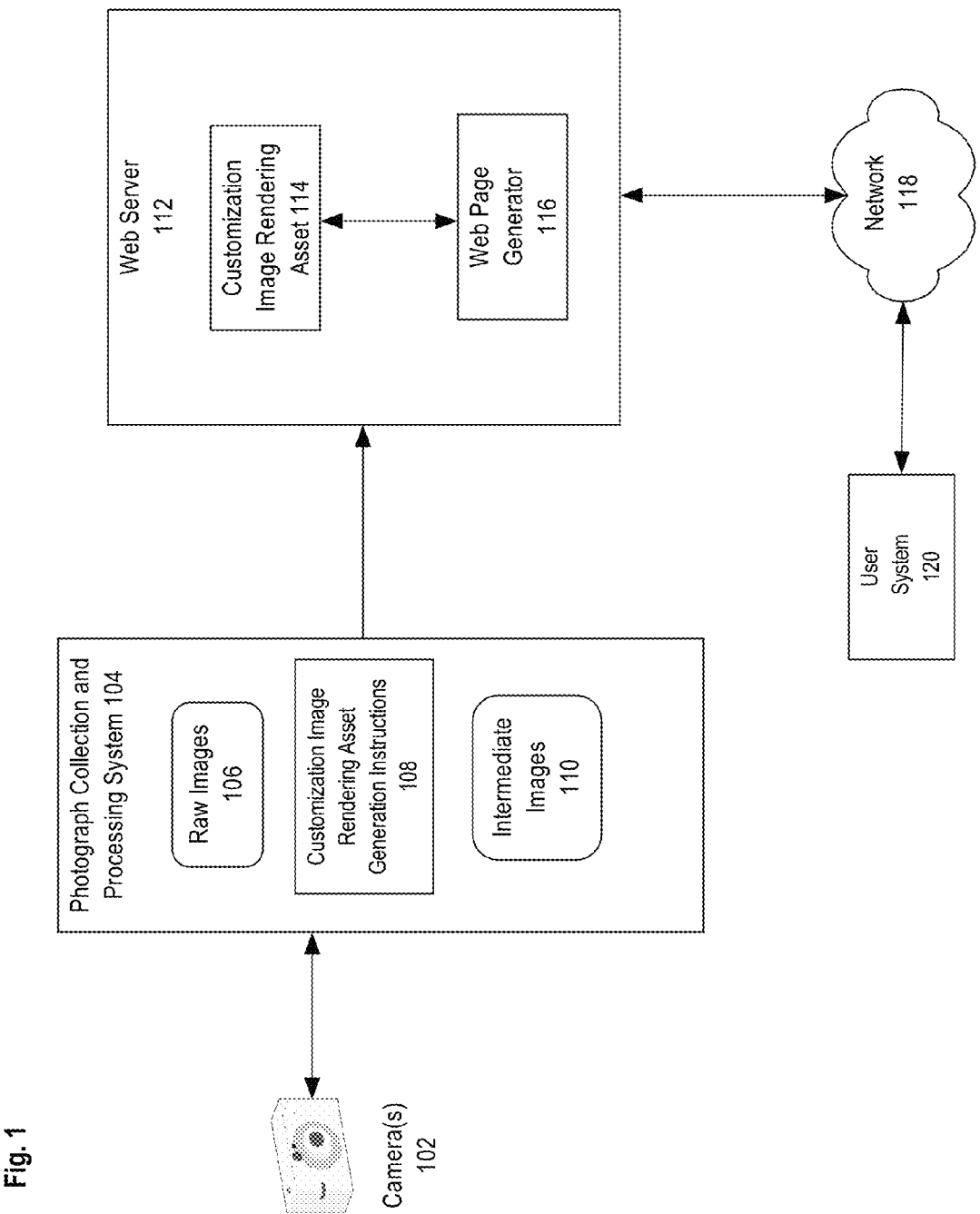
FIG. 1 illustrates an example customization image rendering system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1. General Overview
2. Structural and Functional Overview

3. Generation of Customization Image Rendering Asset
4. Customization Image Display
5. Implementation Mechanisms—Hardware Overview
1. General Overview Techniques for using infrared imaging to create digital images for use in product customization are described. In an embodiment, an infrared photograph of a tangible product having an imprinted markup on the product is received and a visible light photograph of the same product with the same imprinted markup is received, where the imprinted markup is visible in the visible light photograph but is not visible in the infrared photograph is received. Instructions for rendering a customization image of the product depicting a particular customization are determined based in part on the infrared photograph and visible light photograph, where the particular customization is not in the infrared photograph or the visible light photograph.

In an embodiment, the customization specifies one or more designs for imprinting on one or more design areas of the product or a color for at least a portion of the product.

In an embodiment, the particular customization is determined after the instructions for rendering the customization image are determined. The particular customization is provided as an input to the instructions for rendering the customization image.

In an embodiment, at least a portion of a shape and a shading of the particular customization image correspond to a shape and a shading of the imprinted markup.

In an embodiment, luminance information is determined based in part on the infrared photograph. In an embodiment, design geometry information is determined based in part on the visible light photograph. The instructions for rendering the customization image of the product are determined based in part on the luminance information and the design geometry information.

In an embodiment, a color segmentation process is performed an image based on the visible light photograph, resulting in a digitally stored color segmented image. The instructions for rendering the customization image of the product are determined based, in part, on the color segmented image.

In an embodiment, a normalized visible light image is determined by removing luminance from an image based on the visible light photograph. The instructions for rendering the customization image of the product are determined based, in part, on the normalized visible light image.

In an embodiment, a stored digital image of the product without markup is automatically determined based on the visible light photograph and the infrared photograph. The instructions for rendering the customization image of the product are determined based in part on (1) the image of the product without markup and (2) the design geometry information.

In an embodiment, a first color-selected image and a second color-selected image are determined based, at least in part, on particular image, wherein the particular image is the visible light photograph or an image based on the visible light photograph, wherein the markup comprises a plurality of colors. For each region of the particular image that is colored a first color of the plurality of colors, a same region of the first color-selected image is colored a particular color and remaining regions of the first color-selected image is colored a different color than the particular color. For each region of the particular image that is colored a second color of the plurality of colors, a same region of the second color-selected image is colored the particular color and remaining regions of the first color-selected image is colored a different color than the particular color.

In an embodiment, a design mask image is determined based on the first color-selected image and the second color-selected image. Each region of the design mask image that is colored the particular color in either the first color-selected image or the second color-selected image is of a particular mask color in the design mask image and remaining portions of the design mask image are a different color than the particular mask color.

In an embodiment, a grid image is determined based on the first color-selected image and the second color-selected image where the grid image indicates locations at which one or more regions of the first color are adjacent to one or more regions of the second color in the particular image.

In an embodiment, a customization specification specifying the particular customization is received. Performance of instructions for rendering the customization image of the product depicting the particular customization is caused. The display of the customization image of the product depicting the particular customization is caused.

In an embodiment, at least a portion of the instructions for rendering the customization image are associated with a particular viewpoint. A customization specification specifying, at least in part, a customization associated with the particular viewpoint is received. The portion of the instructions for rendering the customization image associated with the particular viewpoint is selected for execution based on the customization specification.

In an embodiment, the product is the first product and the customization image is the first customization image. A customization specification specifying the particular customization is received. In response to the receiving the customization specification, performance of the instructions for rendering the customization image of the product depicting the particular customization, where the particular customization is specified by the customization specification is caused and performance of second instructions for rendering a second customization images of a second product different from the first product depicting the particular customization is caused.

Display of the first customization image of the product depicting the particular customization and the second customization of the second product depicting the particular customization is caused.

2. Structural and Functional Overview

According to an embodiment, an infrared photograph and visible light photographs of the same marked-up product in the same position is captured. In this context, the term "photograph" refers to a digital image obtained using a digital camera, which may be computer-controlled, as further described herein, for example; certain techniques herein involve performing, using a computer, digital transformations in computer memory of stored digital images. The markup on the product may be a particular pattern imprinted upon the product. As one example, the markup is a two-color checkerboard pattern comprised of solid-colored squares, where each square is of a single color and each adjacent square is of the opposite color. The markup is imprinted upon the product using a dye that is only visible in the visible light spectrum and therefore only visible in the visible light photograph, and not visible when imaged using spectral sampling in standard infrared photography. In some embodiments, an organic dye having these characteristics may be used to print the markup before the photographs are taken.

The infrared photograph, or a modified version thereof, may be analyzed using computer-based techniques to determine the luminance of one or more regions of the infrared photograph. The luminance information for a particular region of the infrared image may indicate the appropriate luminance values for the corresponding particular region in the customization image. For example, the luminance values may indicate how the particular region of the customization image is to be shaded. An analysis of the imprinted markup that is visible in the visible light photograph, or a modified version thereof, may be used to determine the location of customizable design area(s) and the geometry of the product within the customizable design area, which may be caused by contours and folds of the product. Color values and information for rendering the remaining regions of the image, which do not feature any customizations, may also be determined based on the visible light image, or a modified version thereof.

The information determined based on the infrared image and the visible light image, such as luminance information, geometry information, and the determined location of the customizable area, may be used to generate a customization image rendering asset. The customization image rendering asset may contain instructions which, when executed, cause the automatic rendering of a customization image that depicts a product as customized according to a particular customer-specified customization. The customization image rendering asset may automatically generate the customization image in real-time, upon receiving the customer-specified customization. The same customization image rendering asset may be capable of rendering a customization image for a variety of customer-specified customizations of a particular product.

The customization asset may be automatically determined based on the infrared and visible light photographs, by executing customization rendering asset generation instructions. The automatic determination of the customization image rendering asset, without any human involvement, reduces the time and cost needed to generate customization image rendering assets.

According to some embodiments, the rendering asset generation instructions and/or the custom image rendering asset instruction may be configured to allow editing or modification to produce an asset for a particular artistic or commercial intent.

FIG. 1 illustrates an example customization image rendering system. One or more cameras 102 capture infrared and visible light photographs and provide the captured photographs to a photograph collection and processing system 104. In an embodiment, the camera(s) 102 comprise a first camera configured to capture infrared photographs, and a second, separate camera configured to capture visible light photographs. The camera(s) configured to capture infrared photographed may be mounted in a fixed relationship to a hot mirror that reflects infrared light for capture by the infrared camera and allows visible light to pass through for capture by the second camera. In an embodiment, camera(s) 102 comprise multiple paired sets of cameras, each set positioned to capture a photograph of the product from a different angle, and each set comprising a camera configured to capture infrared photographs and a camera configured to capture visible light photographs. The camera sets may be positioned such that the captured photographs allow a full 360 degree view of the product in the same position. In an embodiment, sixteen (16) pairs of cameras are mounted in sixteen (16) different regularly spaced-apart angular positions around the circumference of a circle in which the subject or product is at a center of the circle.

The operation of camera(s) 102 may be remotely controlled by the photographic collection and processing system 102, or another computer system, such that an operator selection at the system causes camera(s) 102 to capture photographs. In some embodiments, camera(s) 102 may be configured to capture the photographs simultaneously or almost simultaneously. Such an embodiment may be appropriate when the subject of the photographs is an item of apparel worn by a human model or an item worn by or affixed to an animal. In other embodiments, camera(s) 102 may capture the photograph at entirely different times, for example, when the object is a static object.

Photograph collection and processing system 104 receives and stores raw digital images 106 received from camera(s) 102. Photograph collection and processing system 104 comprises customized image rendering asset generation instructions 108, which may be implemented as one or more stored computer programs, scripts, or other software elements. One or more processors of the photograph collection and processing system 104 may execute the customized image rendering asset generation instructions 108 to cause generating customization image rendering instructions. Intermediate images 110 may be images generated and/or used during the generation of a customization image rendering asset. Photograph collection and processing system 104 may send a generated customized image rendering asset to web server 112, such as customization image render asset 114 to be stored and used at web server 112.

Web server 112 may receive and store one or more customization image rendering assets, such as the customization image rendering asset 114. Each customization image rendering asset contains instructions for rendering customization images. Web server 112 also comprises web page generator 116, which determines HTML and/or other web page content. Web server 112 may receive requests for web pages from a user system, such as user system 120. In response, web server 112 may send a web page for display at the user system, and may include a customization image that is generated by the execution of instructions included within the customization image rendering asset. Web server 112 may be operated by an on-line retailer for the generation of online retail web sites.

User system 120 may be the system by which a customer browses the website of an online retailer, selects a product to customize, specifies how the product is to be customized, and receives the customization image. User system 120 may request web pages and web content form web server 112 via network 18, which may be the World Wide Web (WWW).

The system illustrated in FIG. 1 is merely an example of customization image rendering system. Systems of other embodiments may not include each of the components and sub-components illustrated in FIG. 1. Further, for the purpose of clearly illustrating an example, FIG. 1 shows individual instances of various functional elements as described above; however, in various embodiments, each functional element may be implemented as one or more local or distributed computers, processes, software elements or other logic.

Figure 2:
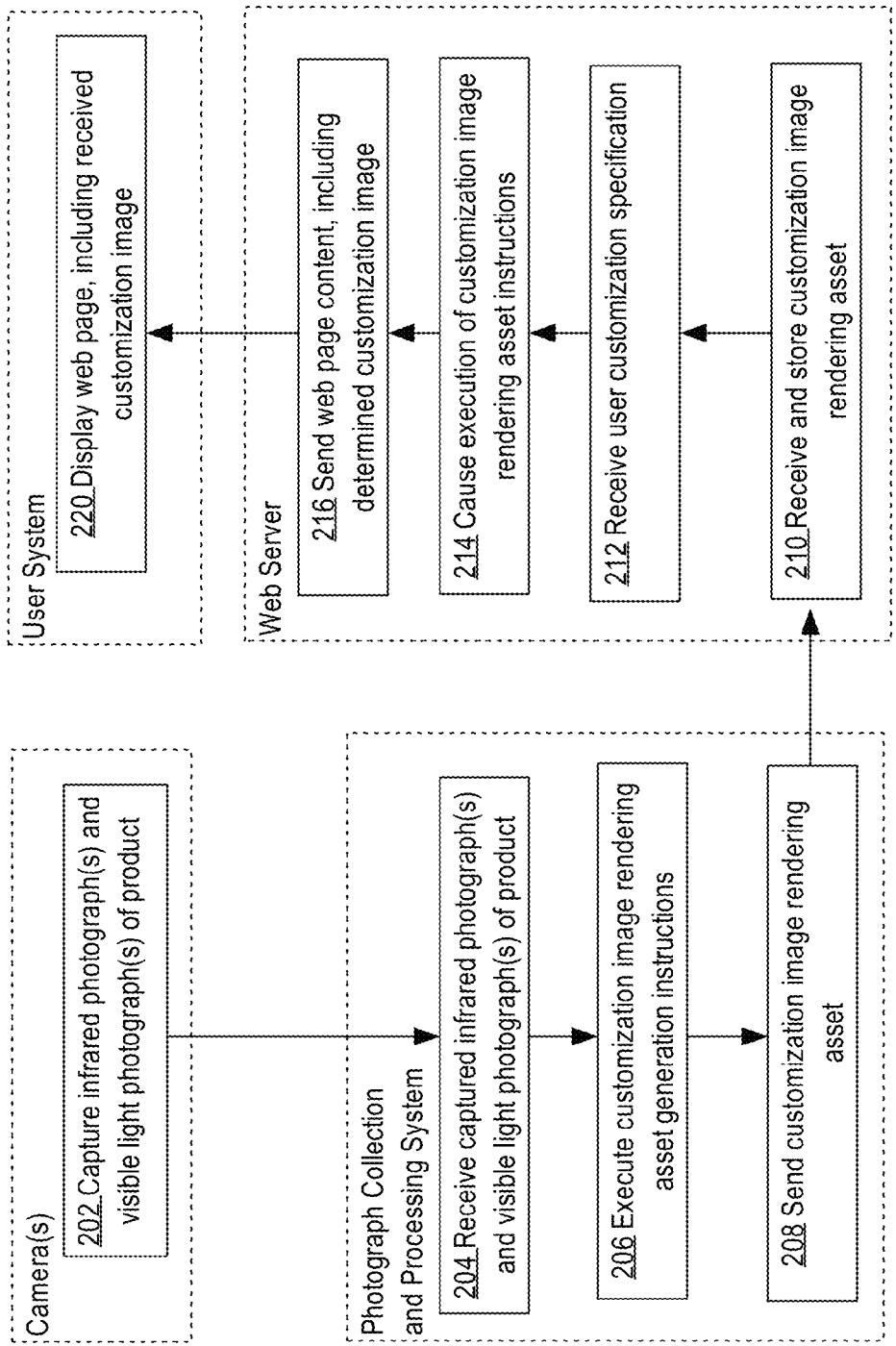
FIG. 2 illustrates an example process that may be implemented on a customization image rendering system.

FIG. 2 illustrates an example process that may be implemented on a customization image rendering system, such as the customization image rendering system illustrated in FIG. 1.

Figure 5:
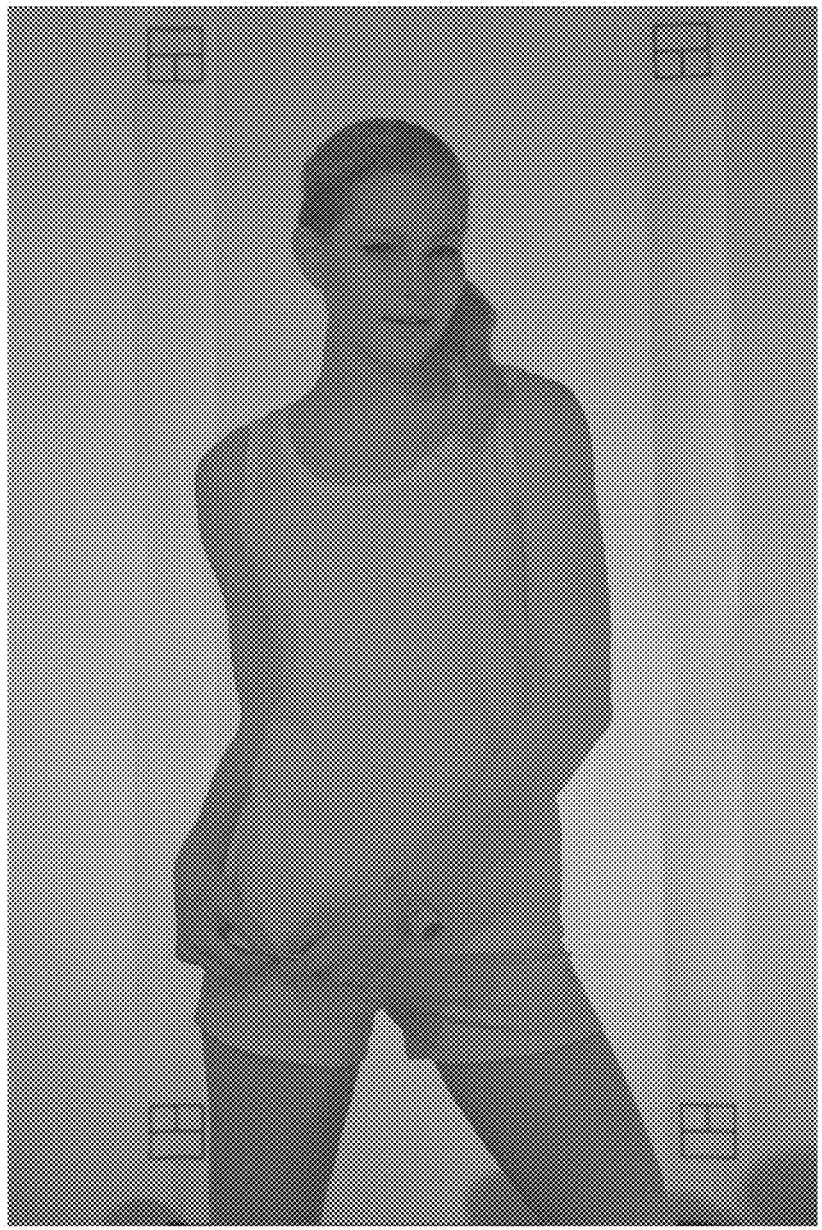
FIG. 5 illustrates an example captured infrared image.
Figure 6:
FIG. 6 illustrates an example captured visible light image.

At block 202, infrared photograph(s) and visible light photograph(s) of a product are captured. The photographed product maybe visibly imprinted with markup. In some embodiments, the product being photographed is modeled by a person or animal. The photograph(s) may be captured at one or more cameras such as camera(s) 102. In an embodiment, multiple sets of cameras are directed at the same product, where each set comprises a camera configured to capture an infrared photographs and a camera configured to capture visible light photograph, both in response to an operator indication. The cameras may be configured to capture photographs simultaneously, or within a short period of time, to ensure that the position of the model and product is the same in both the infrared image and the visible light image. FIG. 5, FIG. 6 respectively illustrate an example captured infrared image and an example captured visible light image, and are described further below as a specific example.

Figure 3:
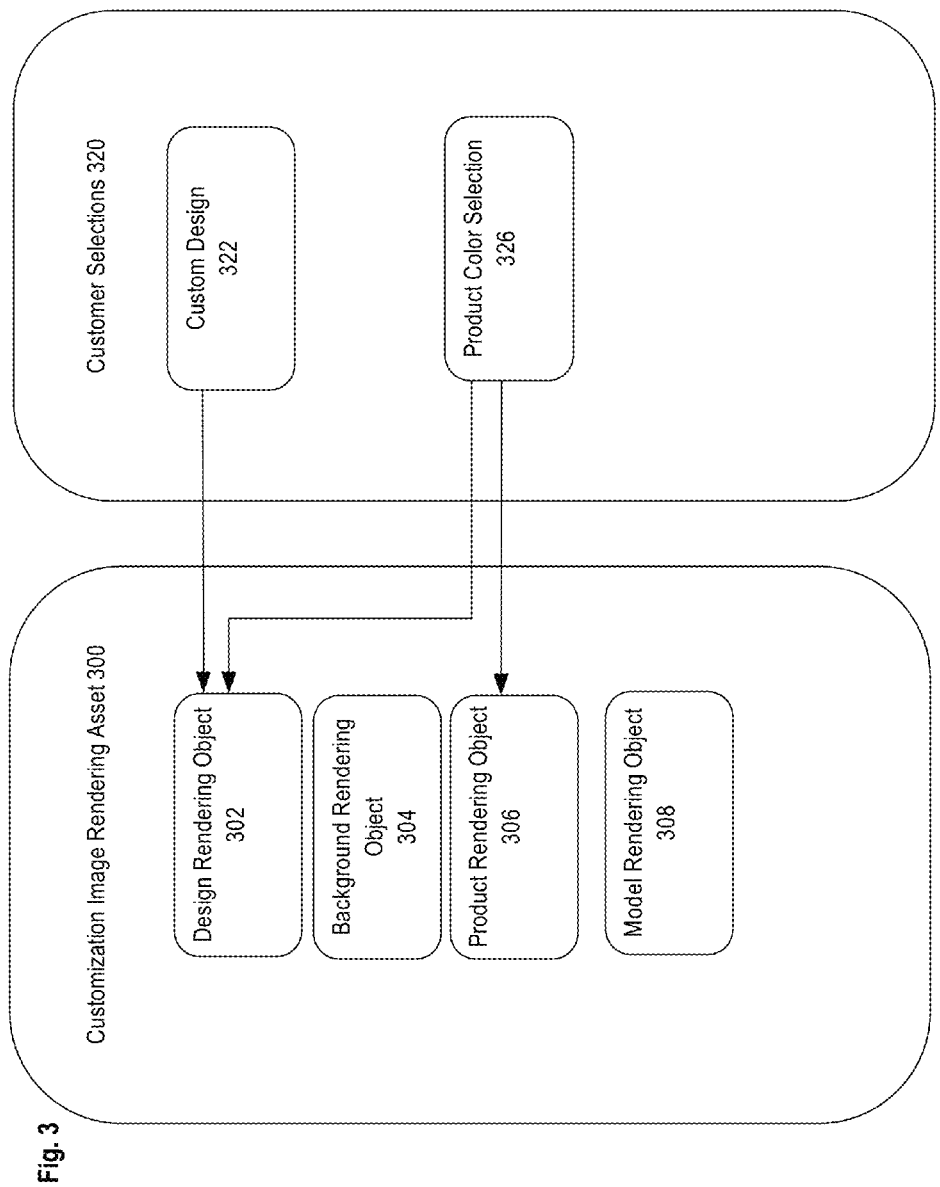
FIG. 3 illustrates an example customization image rendering asset and corresponding run-time inputs.
Figure 4:
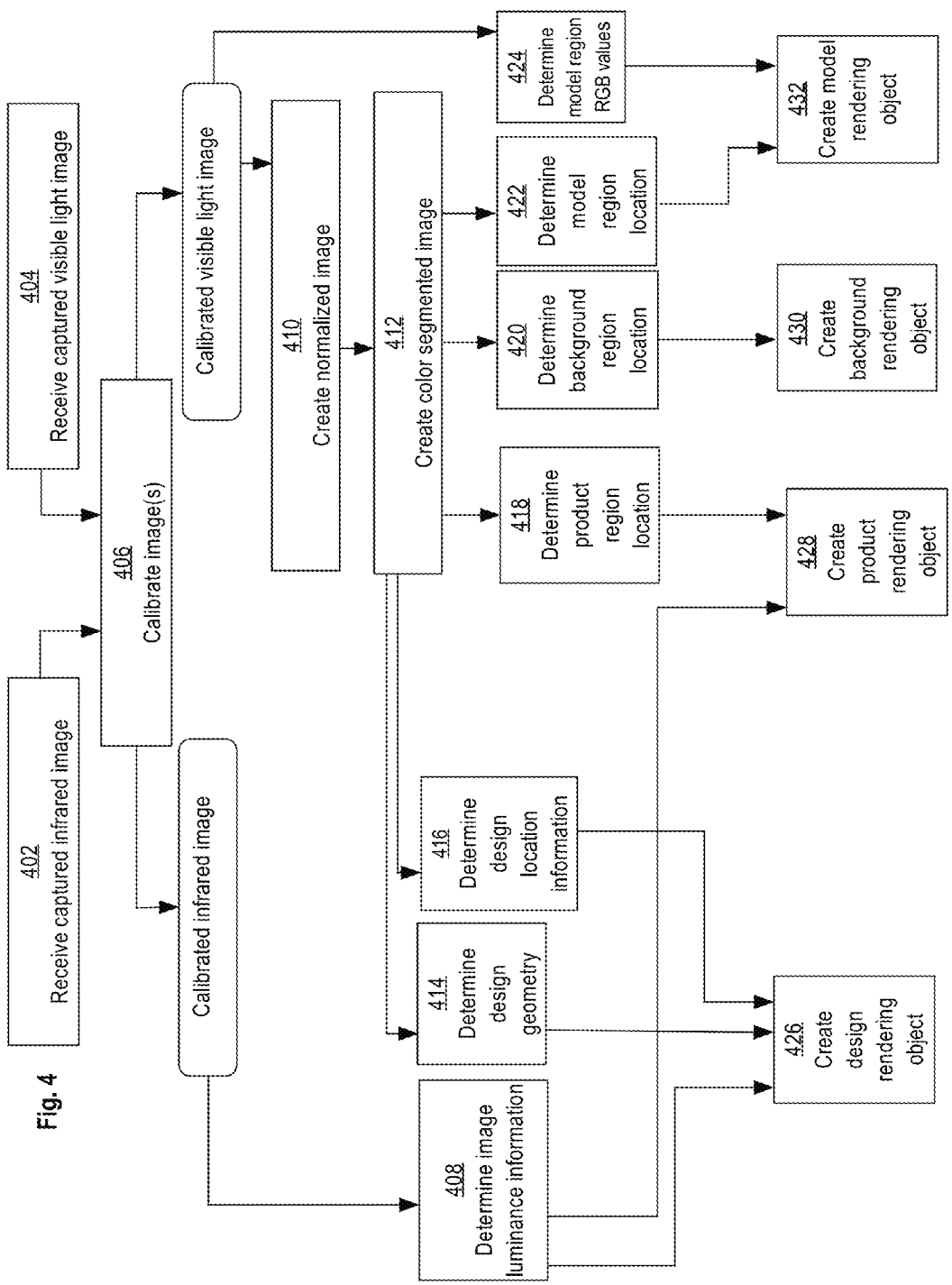
FIG. 4 illustrates an example process for the generation of a customization image rendering asset.

At block 204, a photograph collection and processing system, such as photograph collection and processing system 104 of FIG. 1, receives the captured infrared photograph(s) and visible light photograph(s) of the product. At block 206, customization image rendering asset generation instructions are executed at the photograph collection and processing system. The execution of the customization image rendering asset generation instructions cause the generation of a customization image rendering asset. FIG. 3 illustrates an example customization image rendering asset and corresponding run-time inputs, and FIG. 4 illustrates an example process of the generation of a customization image rendering asset, which are further described below as a specific example.

At block 208, the customization image rendering asset is sent to the web server. Multiple products may be photographed individually, and a different customization image rendering asset may be created for each of the multiple products at the photograph collection and processing system, and each of the customization image rendering assets may be sent to the web server.

At block 210, the customization image rendering assets are received and stored at a web server, such as web server 112. The web server may store various customization image rendering assets. At block 212, the web server receives a customer customization specification. The customer may have provided the specification by interacting with a graphical interface presented within a web page viewed at a user system. The user customization specification may include a user-specified design for imprinting on the customizable product, customization location information specifying where a particular customization is to be located, a color for a detail area of the product such as a trim color, a color for the entire product, and other customization specification information.

At block 214, the instructions of a particular customization image rendering asset are executed. The web server may store a customization image rendering asset for each customizable product. The web server may automatically select a particular customization image rendering asset for execution of its instructions based on the received customization specification. For example, the web server may select a particular customization image rendering asset that corresponds to a particular customizable product in response to determining that the customer selected to customize the particular customizable product. Information provided by the user, and included in the received user customization specification may be used to automatically determine inputs for the customization image rendering asset. For example, a customer may select a particular shirt color and the selected color, or a color curve corresponding to the selected color, may be provided as an input to the customization image rendering asset instructions when the instructions of the customization image rendering asset are executed. Executing the instructions of the customization image rendering asset results in a customization image that depicts the customer-selected product as customized according to the customer's specifications.

At block 216, the web server sends web page content to the user system that provided the customization specifications, which may be user system 120. The web page content includes the image determined as a result of executing the instructions of the customization image rendering asset, or a modified version of such an image. At block 220, a web page that includes the received customization image is displayed at the user system.

FIG. 3 illustrates an example customization image rendering asset and corresponding run-time inputs. Customization image rendering asset 300 is an example customization image rendering asset that generates a customization image when the instructions of the customization image rendering asset are executed. In an embodiment, a customization image rendering asset comprises one or more asset image, image settings, and/or instructions for rendering the resulting customization image, where the instructions refer to the asset images and/or image settings included in the customization image rendering asset. For example, an instruction of the customization image rendering asset may indicate that the color of a particular location of the resulting customization image is to have the color of a source location of a particular asset image, as modified by a luminance adjustment value associated with the particular location.

Customization image rendering asset 300 comprises a plurality of objects that each comprise instructions for rendering a respective portion of the customization image, including design rendering object 302, background rendering object 304, product rendering object 306, and model rendering object 308. Background rendering object 304 renders the background portion of an image, model rendering object 310 renders the model portion of the image, product rendering object 306 renders the product portion of the image without markup or design, design rendering object 302 renders the design portion of the image upon the product.

A design area is an area of the product that is customizable. For example, a 4" by 4" area of a shirt may be customized such that the 4" by 4" area displays a particular image. The design area in such a case would be the 4" by 4" customizable area of the shirt. In some embodiments, a customizable product may comprise multiple design areas, and the customization image rendering asset may comprise a separate design rendering object for each design area. For example, a customizable bag, where the image imprinted on the bag flap is customizable and the design or color on the trim of the bag is customizable, may have a separate design area for the bag flap image and a separate design area for the trim design.

Customer selections 320 may be included in the customer specifications that the user system sends to the web server hosting the customization image rendering asset, or may be determined based on the customer specifications. The customization image rendering asset may refer to customer selections that are provided at run-time. That is, the customer selections may be provided after the customization image rendering asset is received at the web server but before the instructions of the customization image rendering asset are executed.

For example, customer selection 320 includes custom design 322. Custom design 322 is a design provided by the user, or a modified version of the design provided by the user. According to various embodiments, the design may include an image, pattern, and/or text provided or selected by the user. The instructions of design rendering object 302 of customization image rendering asset 300 may refer to custom design 322 when causing the design portion of the customization image to be rendered.

The instructions of design rendering object 302 and product rendering object 306 refer to product color selection 326, which may be, for example, the product color selected by a customer. Design rendering object 302 and the product rendering object 306 may determine which colors to render based on product color selection 326.

3. Generation of Customization Image Rendering Asset

FIG. 4 illustrates an example process for the generation of a customization image rendering asset. A photograph collection and processing system may execute customization image rendering asset generation instructions, which may cause a process such as the process illustrated in FIG. 4 to be executed automatically.

FIG. 4 illustrates merely one example process for the generation of the customization image rendering asset. In other embodiments, different steps may be performed, the ordering of steps may be changed, certain steps may not occur, or additional steps may occur in addition to the steps illustrated in FIG. 4.

At block 402, a captured infrared image is received and, at block 404, a captured visible light image is received. The captured infrared images and captured visible light images may be digital photographs or modified version of the digital photographs. The two images may display a product, with or without a model. The contents of the images, such as the product and model, may be in the same position in both images. The product within the image may be visibly imprinted with markup, but the markup may only be visible in the visible light image and not in the infrared image. In an embodiment, the infrared photograph, as captured and without requiring any image editing to remove the markup, does not display the markup that is visibly imprinted on the product. In an embodiment, the markup is imprinted using an organic dye that is visible when photographed in the visible light spectrum and invisible when photographed in the infrared light spectrum. In an embodiment, each design area of a product is imprinted with markup that covers the entire design area. A design area is an area of the product that may be customized to display a particular customization, such as image(s), pattern(s), and/or text. A design area may also be customized to be a particular color.

FIG. 5 illustrates an example captured infrared image and FIG. 6 illustrates an example captured visible light image. FIG. 5 and FIG. 6 illustrate photographs of a model wearing a tank top imprinted with a checkerboard-style color markup. The markup is imprinted using an organic dye. In other embodiments, the markup may comprise different pattern(s) or shape(s). In some embodiments, the markup may be a single color. As illustrated, markup 602 is visible in the visible light image but is not visible in the infrared light image.

Although, in the illustrated embodiment of the product is a tank top and is photographed as being modeled by a person, in other embodiments, the product may be any of a variety of other customizable products such as other kinds of apparel, bags, accessories, linen, and may not necessarily be modeled. Additionally, in other embodiments, the product may comprise multiple design areas, each design area being imprinted with its own markup.

At block 406, the captured infrared image and captured visible light image is calibrated to determine a calibrated infrared image and calibrated visible light image. In some embodiment, the luminosity and/or color of the images are calibrated. In some embodiments, as a result of the calibration, the resulting infrared image has the same coloring and the same amount of luminosity as the resulting visible light image. In one embodiment, luminosity calibration comprises modifying the luminosity and color of the captured visible light image based on the luminosity and color of the captured infrared image. The color and luminosity of a particular location of the infrared image may be compared to the luminosity and color of the same particular location of the visible light image. For example, the luminosity and color of a particular point of the model's shoulder in the infrared image may be compared to the luminosity and color of the same particular point of the model's shoulder in the visible light image. The luminosity of the entire infrared image may be increased or decreased based on the comparison of the luminosity of the two points. For example, if the particular point has a greater luminosity in the visible light image as compared to the infrared image, the luminosity of the entire infrared image may be increased to match the luminosity of the visible light image. The color of an entire image may be modified similarly.

In other embodiments, the color and luminosity of the visible light image is modified based on the color and luminosity of the infrared image. In some embodiment, the color and luminosity of both images is modified based on the other image, for example by decreasing the luminosity of one image and decreasing the luminosity of the other image to match the average luminosity of the two images. In some embodiments, the color and luminosity of both images is modified based on an image of a calibration object such as a cylinder with areas representing specific, known color spectra.

The images may be cropped and/or rotated. Cropping and/or rotation may be done before calibrating for luminosity so that that same absolute location in both images also corresponds to the same relative location. For example, as a result of the copping and alignment, the location of the particular point in the mode's shoulder may be at location (30,30) in the infrared image, and the same location of the particular point in the model's shoulder may be at the same location (30,30) in the visible light image. Markers visible in both the visible light image and the infrared image may be referenced during the alignment process to ensure that the markers are at the same location in both of the images after alignment. The models may pose in front of a screen imprinted with the markup to ensure that the same markup is visible in both the visible light photograph and the infrared photograph. In other embodiments, the markup may be imprinted on some other surface within the frame of both photographs.

At block 408, image luminance information is determined based on the calibrated infrared image. In other embodiments, the image luminance information may be determined based on a non-calibrated infrared image or a modified version of the calibrated infrared image. In an embodiment, the determined luminance information is a luminance map that identifies a luminance value for each pixel in the infrared image, which indicates the luminance of the respective pixel. The luminance of a particular portion of the infrared image may partially depend on the contours of the article being photographed. For example, a fold in a t-shirt may cause the "fold" portion of the image to have a different luminance value than the remainder of the t-shirt. The luminance map may be used, at least in part, to determine the coloring of one or more portions of the customization image. Thus, the customization image may display the contours of the article as photographed in the infrared light or visible light image.

The calibrated visible light image may be modified and/or analyzed to determine other information for accurately rendering the customization image, such as the location of design areas and other areas, the geometry of the product within the design areas, and the color values of the various portions of the product image. One process for determining such information is represented by blocks 410, 412, 414, 416, 418, 420, 422, and 425.

At block 410, a normalized image is determined based on the calibrated visible light image. The phrase "determine information based on a particular image", as used herein, includes embodiments where the information is determined based on a modified version of the particular image. For example, a normalized image that is determined based on the calibrated visible light image may also be determined based on a visible light image after it is modified in some way.

In an embodiment, the normalized image may be determined by modifying the calibrated visible light image to remove luminance from the calibrated visible light image. One approach for removing luminance from the calibrated visible light image is to is to modify the RGB (Red, Green, Blue) values of each pixel in the image according to Formula 1 below, where R represents the Red value, G represents the Green value $$\left(\frac{R}{\sqrt{R^2+G^2+B^2}}, \frac{G}{\sqrt{R^2+G^2+B^2}}, \frac{R}{\sqrt{R^2+G^2+B^2}}\right) \quad \text{Formula 1}$$

For example, a pixel having an RGB value of (136, 96, 142) would be modified according to Formula 2 below, which would result in a modified RGB value of (0.62, 0.44, 0.65).

$$\left(\frac{136}{\sqrt{136^2+96^2+142^2}}, \frac{96}{\sqrt{136^2+96^2+142^2}}, \frac{142}{\sqrt{136^2+96^2+142^2}}\right) \quad \text{Formula 2}$$

Figure 7:
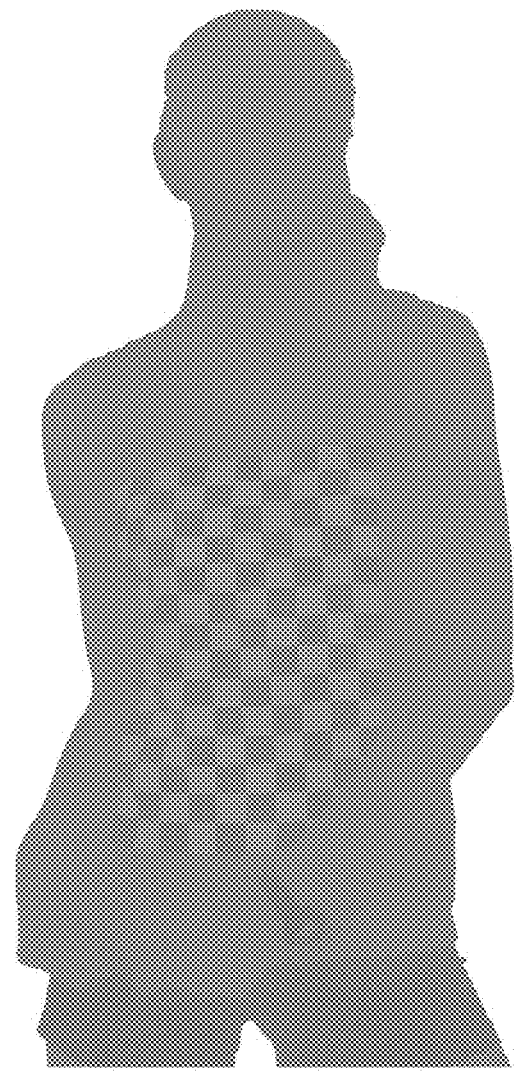
FIG. 7 illustrates an example normalized image.

FIG. 7 is an example of a normalized image. The normalized image of FIG. 7 is determined by removing the luminance values from a calibrated visible light image.

At block 412, a color segmented image is determined based on the normalized image. The color segmentation process results in a modified version of the normalized image, where the color segmented image is represented with a reduced number of colors as compared to the normalized image. The color segmentation process may cause similar colors of the normalized image to be represented as the same color in the color segmented image. In an embodiment, neighboring regions of similar color of the normalized image appear as a single region having uniform color in the color segmented image. Any of a variety of color segmenting techniques may be used to determine a color segmented version of the normalized image.

FIG. 8 illustrates an example color segmented image. The color segment image of FIG. 8 may be determined by applying a color segmentation process to the normalized image of FIG. 7, or a modified version thereof.

Figure 9:
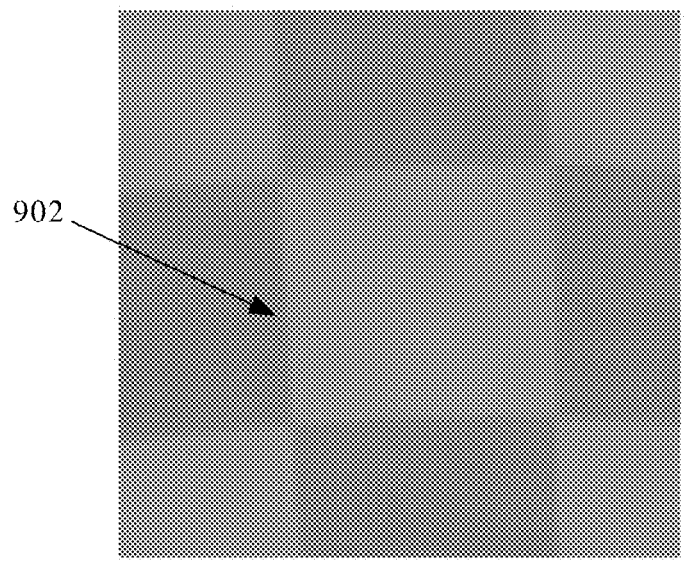
FIG. 9 illustrates a detailed view of the example normalized image of FIG. 7.

FIG. 9 illustrates a detailed view of the example normalized image of FIG. 7.

Figure 10:
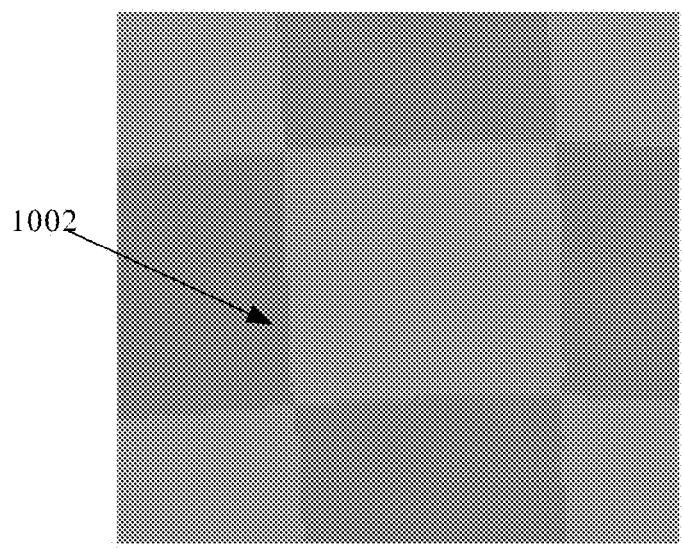
FIG. 10 illustrates a detailed view of the example color segmented image of FIG. 8.

FIG. 10 illustrates a detailed view of the example normalized image of FIG. 7.

A result of the color segmentation process of on embodiment may be understood by comparing the detailed views of the normalized image in FIG. 9 and the detailed view of the color segmented image in FIG. 10. As apparent in FIG. 9, the borders between the colored squares of the markup in the non-color segmented image, such as border 902, are comprised of multiple different colors, which are different blends of purple and yellow rather than just the two main colors of purple and yellow. As apparent in FIG. 10, the borders between the colored squares of the markup in the color segmented image, such as border 1002, are instead comprised of just the two main colors purple and yellow and no other colors. For each region that is of "blended" color in the non-color segmented image, the color of the same region in the color segmented image is modified to be either purple or yellow.

In an embodiment, the color segmentation process results in a color segmented image, where the markup region of the color segmented image comprises only two colors, as illustrated in the color segmented image of FIG. 8, and the background of the color segmented image is entirely the same color.

At block 414, design geometry is determined based on the color segmented image. Design geometry is information that indicates the geometry of the product in one or more design areas. The design geometry may, for example, indicate where the design is twisted, slanted, folded, or obstructed. Design geometry information may include a markup grid image, where the shapes of grid lines indicate the geometry of the product.

Figure 11:
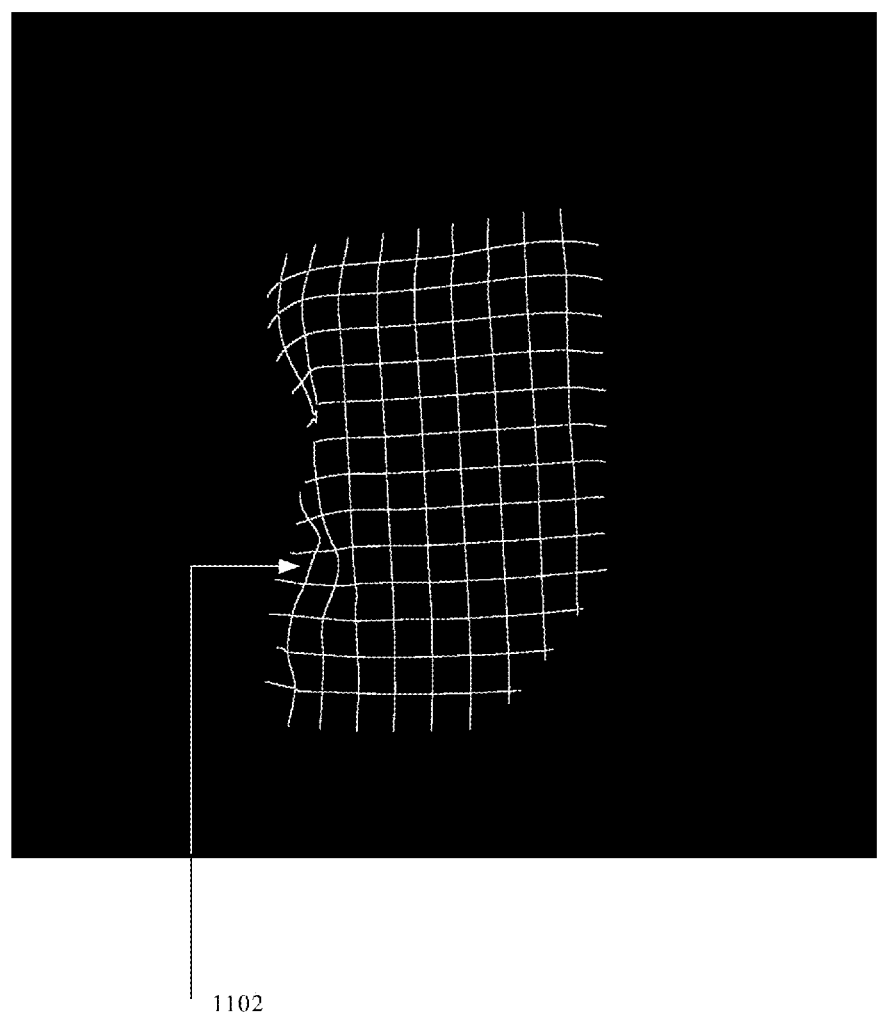
FIG. 11 is an example markup grid image determined based on the color segmented image of FIG. 8.

FIG. 11 is an example markup grid image determined based on the color segmented image of FIG. 8. The shapes of the lines in the markup grid indicate the geometry of the product in the design areas. For example, line 1102 of FIG. 11 is slanted rather than straight, indicating that the product is slanted at the corresponding location. Such information may indicate how a customization design would appear when printed in the design region of a customized product. In an embodiment where there may be multiple design areas, design geometry information may be determined for each of the design areas. Although the markup grid image is illustrated as roughly parallel lines, in other embodiments, the markup grid image may be any of a variety of different shapes and/or patterns determined based on the markup.

At block 416, design location information is determined based on the color segmented image. The design location information indicates the location of a respective design area. In an embodiment where there may be multiple design areas, design location information may be determined for each of the design areas. A design mask image is an image that indicates the location one or more design areas. In an embodiment, the design mask image is a two-colored image where the entire markup region of the color segmented image is represented as one color in the design mask image, and the remainder of the color segmented image is represented as another color different from the color of the markup region. Thus, the particular design area is indicated based on color.

Figure 13:
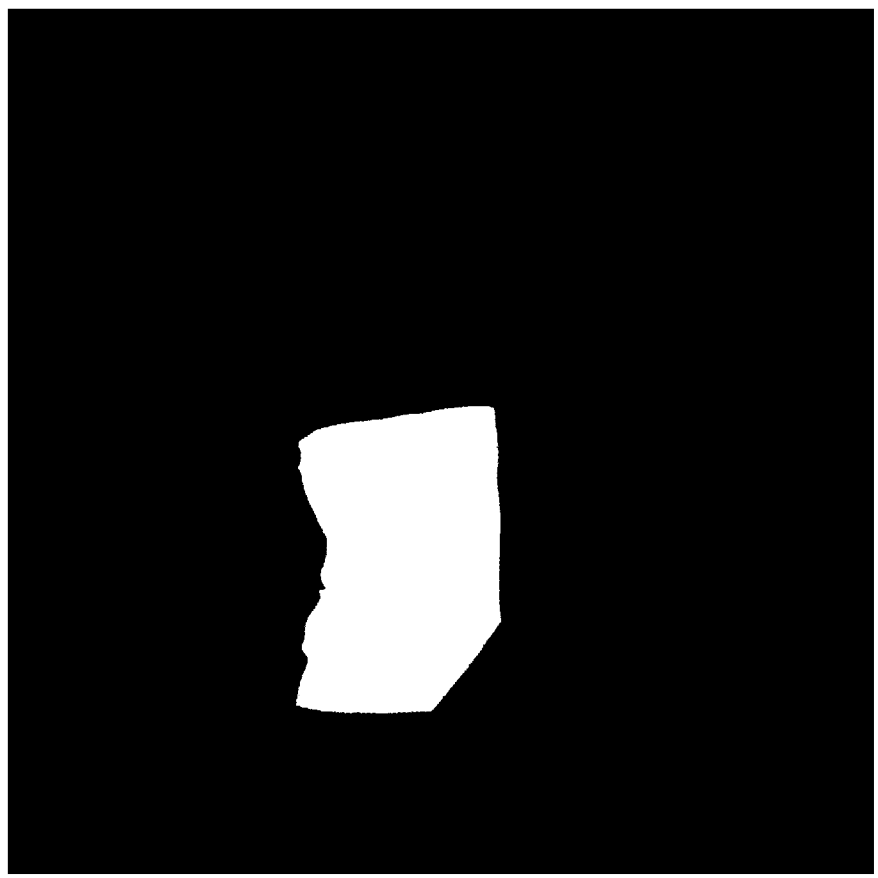
FIG. 13 is an example design mask image determined based on the color segmented image of FIG. 8.

FIG. 13 is an example design mask which may be determined based on the color segmented image of FIG. 8. In FIG. 13, the "design mask" is the white region of the image, which represents the customizable design region of the product. Every region that is not a customizable design region is colored black. In other embodiments, the design location information may be an image comprising more than just two colors, and colors other than black and white.

Figure 12:
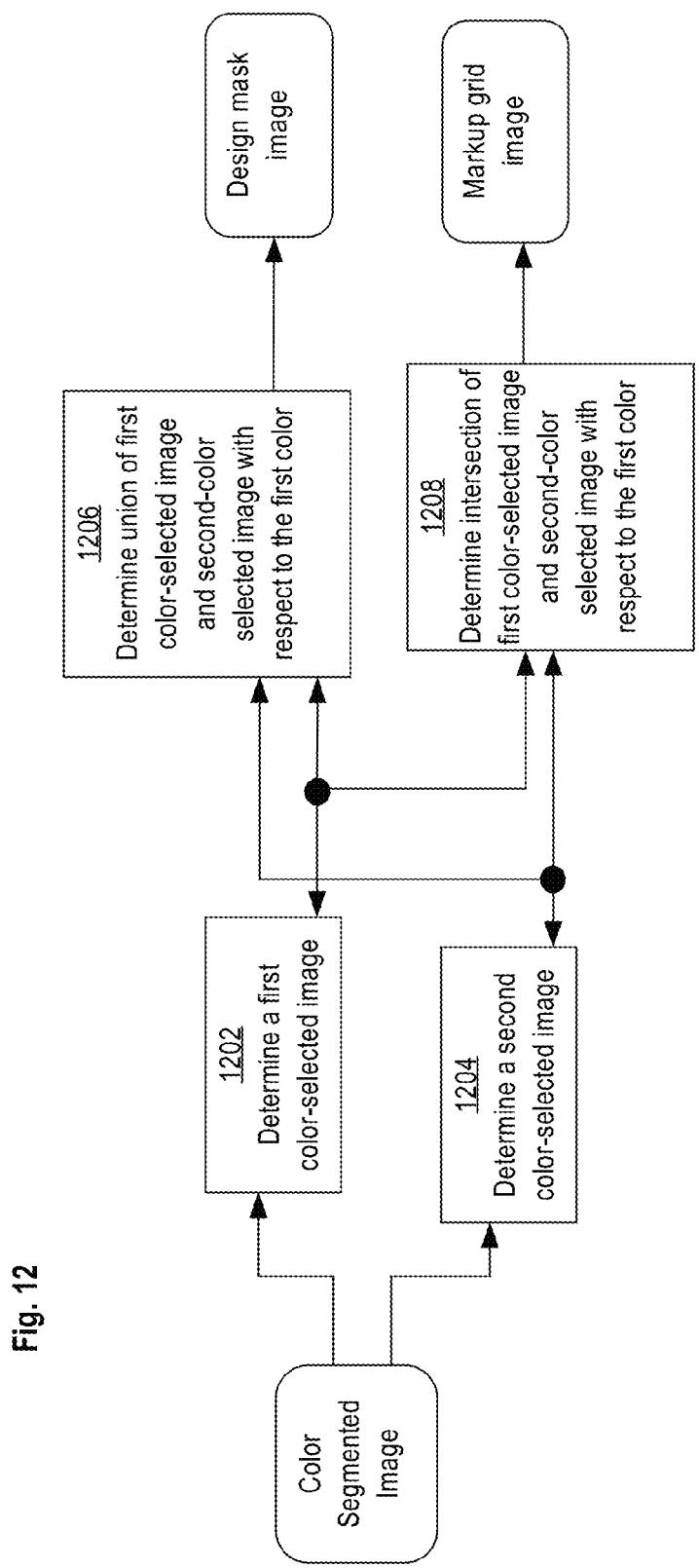
FIG. 12 is an example process for determining a design mask image and a markup grid image based on a color segmented image.

FIG. 12 illustrates an example process for determining a design mask image and a markup grid image based on a color segmented image. In some embodiments, color segmentation may not be done at all, and the design mask image markup grid image may be determined on the normalized itself.

At block 1202, a first color-selected image is determined based on the color segmented image. At block 1204, a second color-selected image is determined based on the color selected-image. In an embodiment, a color-selected image determined based on the color segmented image is the same as the color segmented image, except each region of the selected color in the color segmented image is colored white in the color-selected image, while the remainder of the color-selected image is colored black. Thus each region of the "selected" color is indicated as selected due its white coloring. In other embodiments, colors other than black or white can be used to indicate regions of selected color and regions of non-selected colors.

Figure 14:
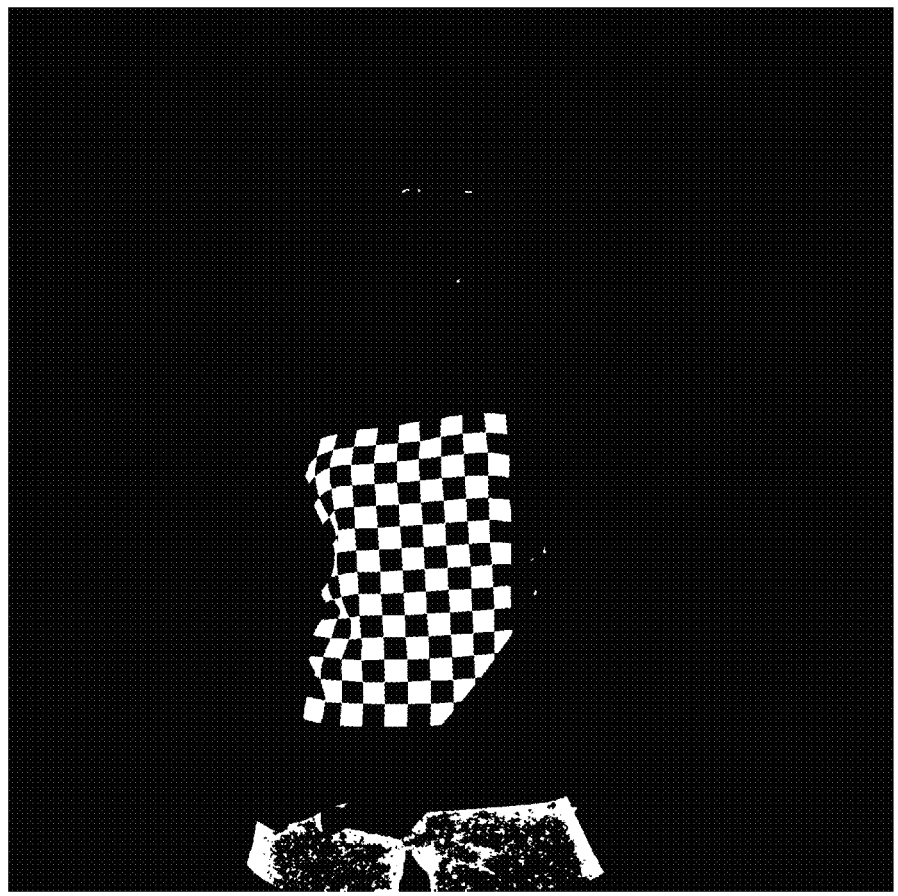
FIG. 14 illustrates an example of a first color-selected image.

In the first color-selected image, a first color of the two-color markup is chosen as the selected color. In the second color-selected image, the other color of the two-color markup is chosen as the selected color. FIG. 14 is an example first color-selected image determined based on the color segmented image of FIG. 8, where the first color is purple. Each region that is colored purple in the color segmented image is colored white in the first color-selected image of FIG. 8 and the remainder of the first color-selected image of FIG. 8 is colored black. The white portions of the first color-selected may then be expanded by a pixel to ensure coverage.

Figure 15:
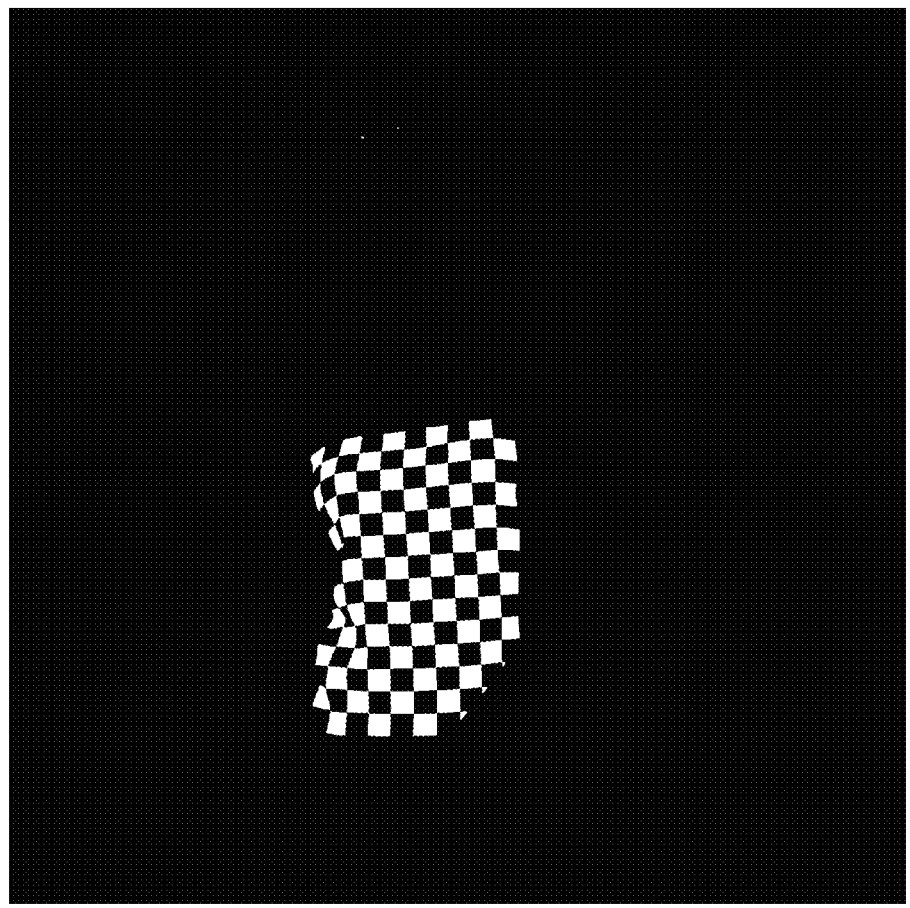
FIG. 15 illustrates an example of a second color-selected image.

FIG. 15 is an example second color-selected image determined based on the color segmented image of FIG. 8, where the second color is yellow. Each region that is colored yellow in the color segmented image is colored white in the first color-selected image of FIG. 8 and the remainder of the first color-selected image of FIG. 8 is colored black. The white portions of the second color image may then be then expanded by a pixel to ensure coverage.

At block 1206, a union of the first color-selected image and the second-color selected image with respect to the first color is determined, resulting in the design mask image. Each region that is white in the first color-selected image or the second-color selected image is white in the first color union image and the remainder of the union image is black. The result is a design mask image, such as the design mask image of FIG. 12, where the design region is represented with a white color that is different from the black color of the remainder of the image. The black portions of the design mask image may then be expanded by a pixel to restore pixel accuracy to the mask.

In an embodiment, the design mask image is of the same size and resolution as the first color selected image and the second color selected image and the design image is initially black. For every pixel where a pixel in the first color-selected image is white, or where a pixel in the second color-selected image is white, the corresponding pixel of the design mask image is colored white. In other embodiments, color(s) other than white may be used to indicate selection of the particular locations.

At block 1208, an intersection of the first color-selected image and the second-color selected image with respect to the first color is determined, resulting in the markup grid image. Each region that is white in both the first color-selected image and the second-color selected image is white in the first color union image and the remainder of the intersection image is black. The result is a markup grid image, such as the markup grid image of FIG. 11, where the lines of the grid correspond to the shape of the borders between the squares in the markup of the color segmented image. A markup grid image determined using such an approach may indicate the locations at which region(s) of the first color are adjacent to region(s) of the second color in the color segmented image. In other embodiments, the locations at which regions of the two colors are adjacent may be determined using other approaches.

In an embodiment, the grid image is of the same size and resolution as the first color selected image and the second color selected image and the grid image and is initially black. For every pixel where a selected pixel in the first image is adjacent to a selected pixel in the second image, the corresponding pixel of the grid image is colored white, or another color.

At block 426, a design rendering object is determined based on the determined image luminance information, determined design geometry, and determined design location information. The luminance information may be a luminance map, the design geometry information may be a vector or polygonal representation of the markup grid image, and the design location information may be a design mask image. The design rendering object comprises instructions for rendering the design portion of the image upon the product. The design portion of the customization image may depict the natural shading and contouring of the product as photographed and as apparent in the infrared and/or visible light image photographs.

Figure 16:
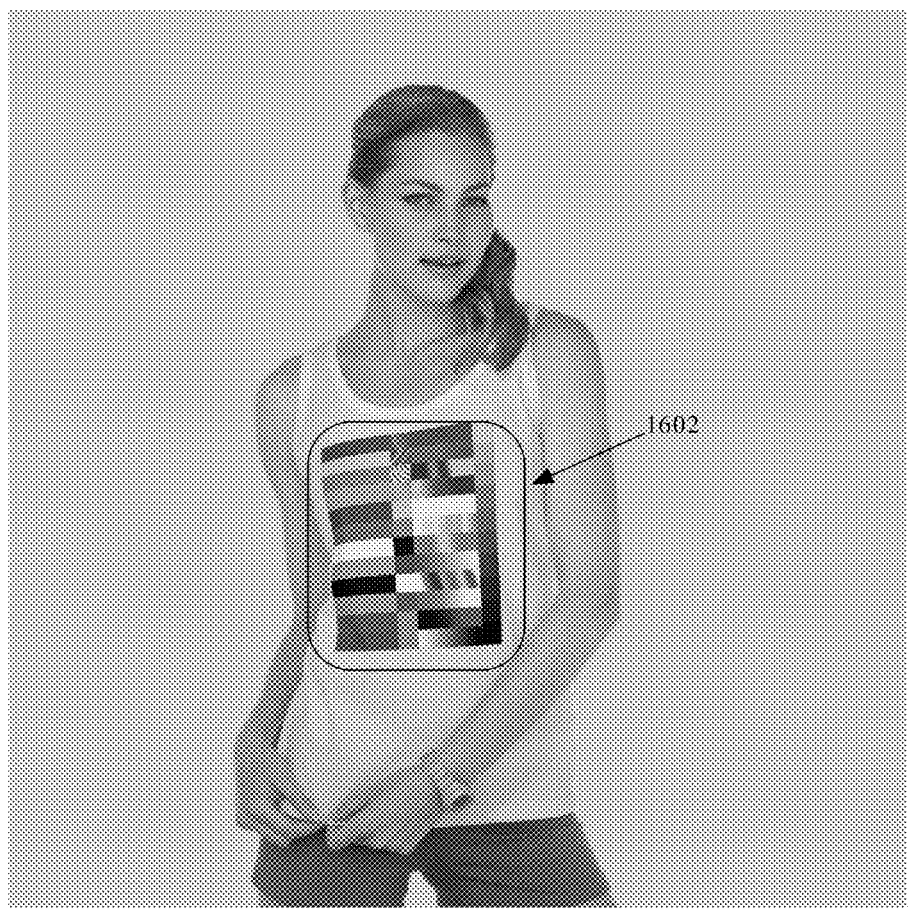
FIG. 16 illustrates an example customization image created by a customization image rendering asset.

FIG. 16 illustrates an example customization image created by a customization image rendering asset. The image of FIG. 16 may be rendered by a customization image rendering asset, which is automatically determined based on the example captured infrared image of FIG. 5 and the example captured visible light image of FIG. 6. Design 1602 may be a custom design selected by a customer and provided as an input the customization image rendering asset. The custom design, as provided by the customer, may be a flat image with no contouring and shading and, as apparent in FIG. 16, the customization image rendering asset may render the design to have the same shape and shading as the markup, as depicted in the infrared image photograph and/or the visible light photograph. For example, the design of the customization image may appear twisted, slanted, folded, or obstructed at the same locations at which the markup is twisted, slanted, folded, or obstructed in the visible light image The design geometry information, such as a markup grid image, may be used to render a modified version of a customer-provided flat design image, where the modified version depicts the geometry and contours of the product as photographed. For example, a grid of the design image may be mapped to a grid of the markup grid image, which may in turn be mapped onto a grid of the final customization image. Example processes for determining modifications to a design image based on design geometry information is described in U.S. Pat. No. 8,174,521 and other patent applications and patents incorporated herein, although other processes may be used in different embodiments.

The region of the final customization image that is to contain the design may be determined based on the design location information. For example, in a design mask where the design area is be represented as white while the remainder of the design mask image is black, the design may only be rendered in the regions of the final customization image that are "white" in the design mask image.

The luminance of the design in the final customization image may be determined based on the luminance information determined based on the infrared photograph and based on a customer-submitted design image. For example, the luminance of the customization image may be the luminance of the design image, adjusted by a value determined based on a luminance map that identifies the luminance for each pixel in the infrared image. Such a modification may cause the design image to have the natural shading of the product as photographed.

The instructions of the product rendering object may accept inputs. In an embodiment, the coloring of the design may adjust based on a customer-provided product color selection. If the customer-provided product color selection is a darker color, the colors of the design area(s) may be lightened to more accurately represent how the design would look if imprinted on a dark-colored product.

At block 420, the location of the background region of the customization image is determined. The background region of the customization image is the background portion of the image that is rendered by the background rendering object. In an embodiment, the location of the product region is determined by identifying the region of the color segmented image that has a color closest to a reference color, such as white, in the color segmented image to be the background region.

The background of the rendered customization image may be a variety of colors, patterns, or design according to varying embodiments. In some embodiments, a manufacturer of the product corresponding to the customization asset is a different entity than the online retailer that determined the customization image. The manufacturer of the corresponding may select a particular background color and the selected color may be provided as an input to the process which generates the customization image rendering asset. As a result, the instructions of the customization image rendering asset may cause the background to be the selected color, design or pattern.

At block 430, the background rendering object is determined. The background rendering object comprises instructions for rendering the background portion of the customization image. Based on the determined location of the background region and the selected background color, pattern, or design, or default background color, pattern, or design if no selection is received, the background rendering object is generated.

At block 418, the location of the product region of the customization image is determined. In an embodiment, the location of the product region is determined by identifying the region of the color segmented image that has a color closest to white, other than the identified background region. In other embodiments, a reference color other than white may be used.

At block 428, a product rendering object is determined. In an embodiment, the product rendering object is determined based on image luminance information, the determined location of the product region, and a color-luminance mapping.

The luminance information may, for example, indicate the luminance of each pixel in the product region, which may be determined based on the infrared image. The color-luminance mapping may be a color curve, which identifies a plurality of color shades and indicates a corresponding luminance value for each color shade. In an embodiment, for each pixel in the product region, a particular color is determined for rendering at the pixel by (1) determining the luminance value for the particular location based on the luminance map and then (2) selecting the color shade of the color curve that corresponds to the determined luminance value to be the particular color. The instructions for the product rendering object may then comprise instructions to render the particular color at the particular pixel of the customization image. As a result, the product portion of the customization image may depict the shading and contouring of the product as photographed and as apparent in the infrared and/or visible light image photographs.

The instructions of the product rendering asset may be configured to receive inputs. For example, the particular color curve, upon which the determination of the product rendering object is based, may be selected based on a customer-provided product color selection. The customer may select a particular as the product color for the customized product and the customized product may, as a result, cause the product to be of the selected color.

At block 422, the model region of the customization image is determined. In an embodiment, the location of the model region is determined by identifying the region of the color segmented image that remains after excluding the identified design area region(s), product region, and background region. In an embodiment, the model region of the customization image is the same as the model region of the visible light image, without any modification to color values, or geometric adjustments. At block 424, the RGB values of the model region are determined based on the visible light image. At block 432, the model rendering object is determined based on the determined RGB values and the determined location of the model region. The model rendering object may comprise instructions that render the RGB colors of the visible light image, as determined, in the model region of the customization image.

Figure 17:
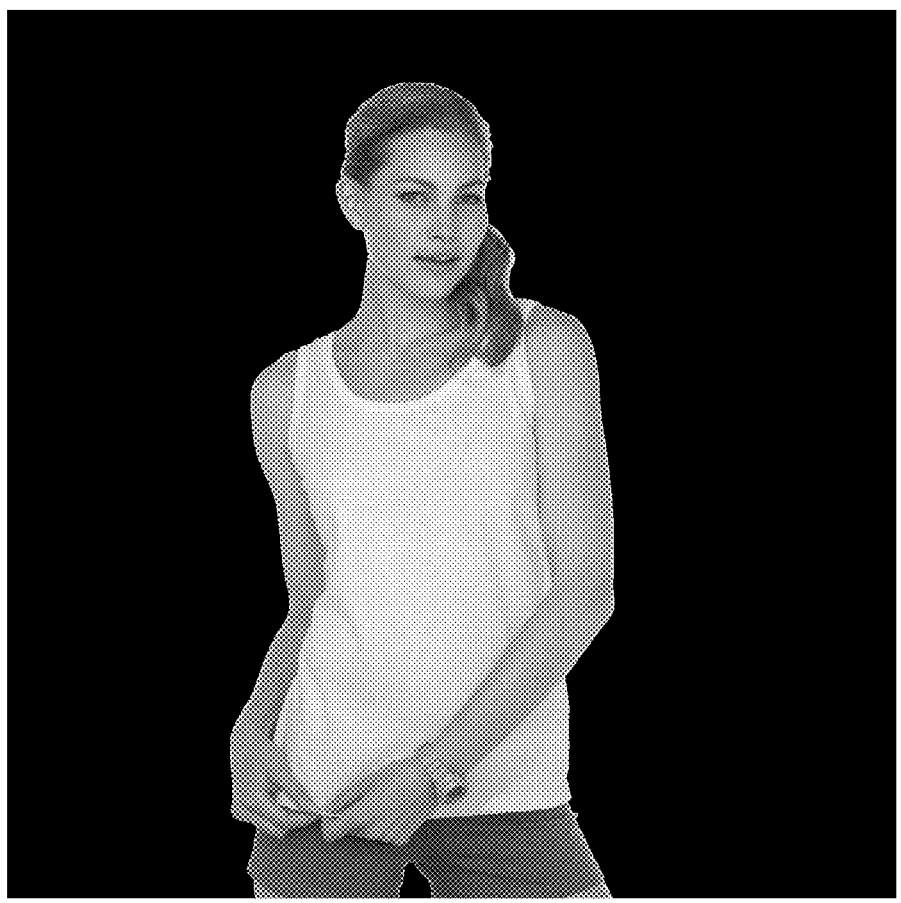
FIG. 17 illustrates an example unmarked product image.

In an embodiment, the instructions of the product rendering object, background rendering object, and model rendering object are executed before the instructions of the design rendering object. Execution of the product rendering object instructions, background rendering object instructions, and model rendering object instructions may cause the generation of an unmarked product image that is without markup and without a design, such as the example unmarked product image of FIG. 17. The customization image rendering asset may comprise the unmarked product image and instructions for rendering a customization image that depicts the design upon the unmarked product image.

4. Customization Image Display

In an embodiment, a first customization image may be displayed to a user and, in response to the user specifying further customizations, an updated customization image may be displayed to the user. The customization image asset may be capable of rendering an updated customization image as customization inputs are received from the user. The user may be a customer shopping for customizable products.

The web server may store instructions for rendering customization images of the same product from a variety of viewpoints. The same asset may be capable of rendering a plurality of customization images, each depicting the same product from a different viewpoint. In another embodiment, a plurality of customization image rendering assets may be associated with the same product, and each asset may render a customization image depicting the product from a different viewpoint.

The user may specify a particular viewpoint for the customization image, or a particular viewpoint may automatically be selected for the user. For example, a user may specify a particular customization and a particular viewpoint associated with the particular customization may automatically be selected. The particular set of customization image rendering instructions, which are capable of rendering the customization from the particular automatically selected viewpoint, may be selected in response to user's specification of the customization. For example, the user may specify a pattern to be imprinted on the sides of a bag. Such a customization may be associated with a side view customization image because the particular customization may best be viewed from the side view angle. Thus, in response to the user's specification of such a customization, the particular customization image rendering asset that is capable of rendering a side view customization image may be selected in response to the user specification, and the resulting customization image may be displayed to the user.

A particular user selection may cause the instructions of a plurality of different customization image rendering assets to be executed. In an embodiment, a user provides customizations for a plurality of customizable products concurrently using the same graphical interface, which displays a separate customization image for each of the products. For example, a user may customize a baseball t-shirt, tank top, and short-sleeve shirt at the same time using a single graphical interface that displays a customization image for each of the products.

The user may specify a particular customization and, as a response, the customization image for each of the variety of products may update. Each of the products may correspond to a separate customization image rendering asset and, in response to receiving the user's specification of the customization, the web server may cause each of the plurality of customization image rendering assets to render an updated customization image of the corresponding product. For example, a user may specify a particular design for imprinting on the front of a shirt. In response, instructions of the customization image rendering asset for the baseball t-shirt, the customization image rendering asset for the tank top, the customization image rendering for the short-sleeve shirt may all be executed. The resulting customization images of the different types of shirts, each displaying the same design on the front of the shirt, may be displayed at the user computer.

5. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 18:
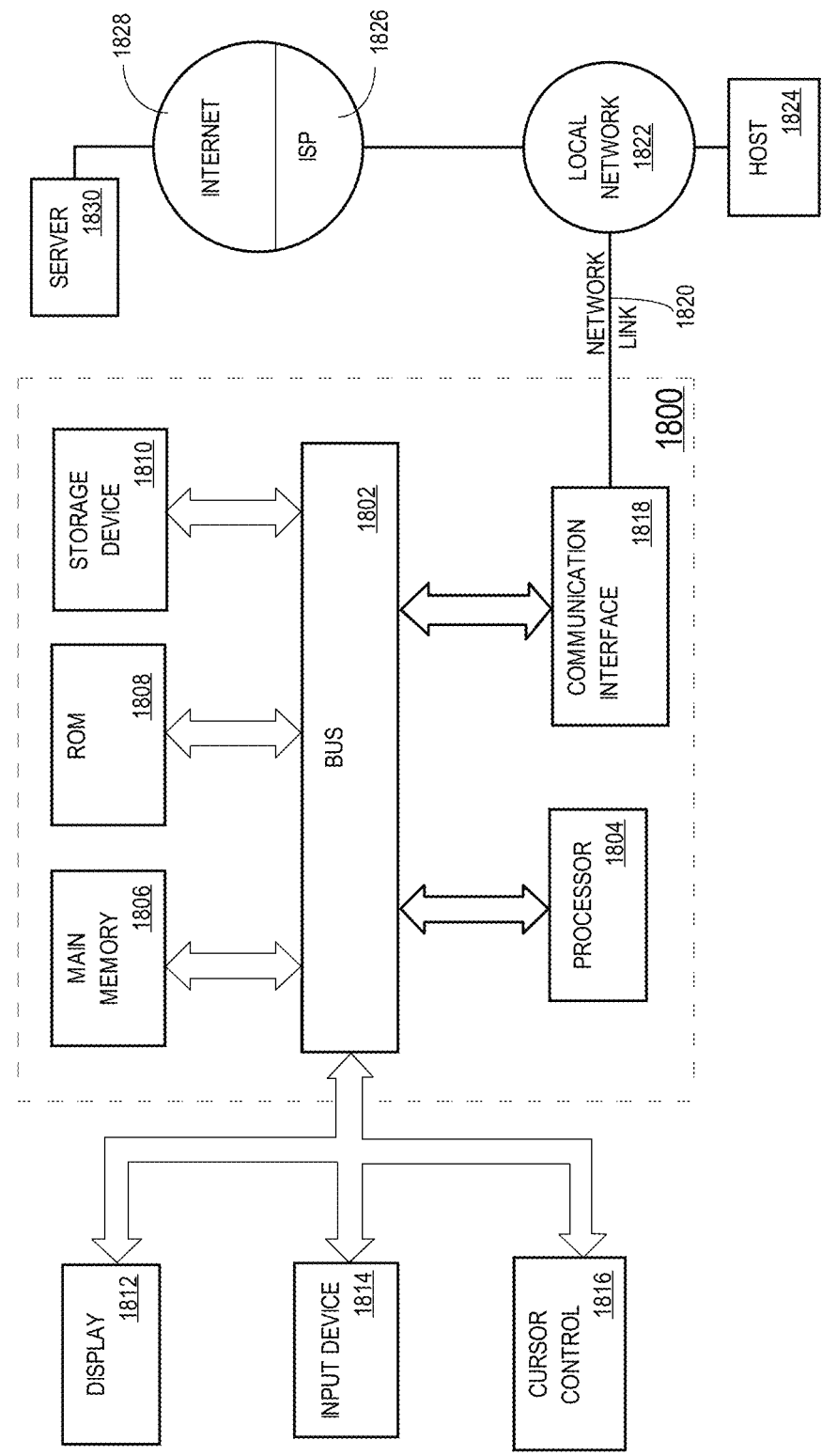
FIG. 18 is a block diagram that illustrates a computer system with which the techniques herein may be implemented.

For example, FIG. 18 is a block diagram that illustrates a computer system 1800 upon which an embodiment of the invention may be implemented. Computer system 1800 includes a bus 1802 or other communication mechanism for communicating information, and a hardware processor 1804 coupled with bus 1802 for processing information. Hardware processor 1804 may be, for example, a general purpose microprocessor.

Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1810. Volatile media includes dynamic memory, such as main memory 1806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 630 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving an infrared photograph of a tangible product having an imprinted markup on the product;
   receiving a visible light photograph of the same product with the same imprinted markup, wherein the imprinted markup is visible in the visible light photograph but is not visible in the infrared photograph;
   determining, based, in part, on the infrared photograph and visible light photograph, instructions for rendering a customization image of the product depicting a particular customization, wherein the particular customization is not in the infrared photograph or the visible light photograph;
   wherein at least a portion of a shape and a shading of the customization image correspond to a shape and a shading of the imprinted markup;
   wherein the method is performed by one or more computing devices.

2. The computer-implemented method of claim 1, wherein the customization specifies one or more designs for imprinting on one or more design areas of the product or a color for at least a portion of the product.

3. The computer-implemented method of claim 1, further comprising determining the particular customization after determining the instructions for rendering the customization image and providing the particular customization as an input to the instructions for rendering the customization image.

4. The computer-implemented method of claim 3, further comprising:
   receiving a customization specification specifying the particular customization;
   causing performance of the instructions for rendering the customization image of the product depicting the particular customization;
   causing display of the customization image of the product depicting the particular customization.

5. The computer-implemented method of claim 1, further comprising:
   determining, based in part on the infrared photograph, luminance information;
   determining, based in part on the visible light photograph, design geometry information;
   wherein the instructions for rendering the customization image of the product are determined based in part on the luminance information and the design geometry information.

6. The computer-implemented method of claim 5, further comprising:
   determining, automatically, based on the visible light photograph and the infrared photograph, a stored digital image of the product without markup;
   wherein the instructions for rendering the customization image of the product are determined based in part on the image of the product without markup and the design geometry information.

7. The computer-implemented method of claim 1, further comprising performing a color segmentation process on an image based on the visible light photograph, resulting in a digitally stored color segmented image, wherein the instructions for rendering the customization image of the product are determined based, in part, on the color segmented image.

8. The computer-implemented method of claim 1, further comprising determining a normalized visible light image by removing luminance from an image based on the visible light photograph, wherein the instructions for rendering the customization image of the product are determined based, in part, on the normalized visible light image.

9. The computer-implemented method of claim 1, further comprising:
   determining a first color-selected image and a second color-selected image based, at least in part on particular image, wherein the particular image is the visible light photograph or an image based on the visible light photograph, wherein the markup comprises a plurality of colors;
   wherein, for each region of the particular image that is colored a first color of the plurality of colors, a same region of the first color-selected image is colored a particular color and remaining regions of the first color-selected image is colored a different color than the particular color;
   wherein, for each region of the particular image that is colored a second color of the plurality of colors, a same region of the second color-selected image is colored the particular color and remaining regions of the first color-selected image is colored a different color than the particular color.

10. The computer-implemented method of claim 9, further comprising:
    determining a design mask image based on the first color-selected image and the second color-selected image, wherein each region of the design mask image that is colored the particular color in either the first color-selected image or the second color-selected image is of a particular mask color in the design mask image and remaining portions of the design mask image are a different color than the particular mask color.

11. The computer-implemented method of claim 9, further comprising determining a grid image based on the first color-selected image and the second color-selected image wherein the grid image indicates locations at which one or more regions of the first color are adjacent to one or more regions of the second color in the particular image.

12. The computer-implemented method of claim 1, wherein at least a portion of the instructions for rendering the customization image are associated with a particular viewpoint;
the method further comprising:
receiving a customization specification specifying, at least in part, a customization associated with the particular viewpoint;
selecting, based on the customization specification, the portion of the instructions for rendering the customization image associated with the particular viewpoint for execution.

13. The computer-implemented method of claim 1, wherein the product is a first product, the customization image is a first customization image, the method further comprising:
receiving a customization specification specifying the particular customization;
in response to the receiving the customization specification:
causing performance of the instructions for rendering the customization image of the product depicting the particular customization, wherein the particular customization is specified by the customization specification;
causing performance of second instructions for rendering a second customization images of a second product different from the first product depicting the particular customization;
causing display of the first customization image of the product depicting the particular customization and the second customization of the second product depicting the particular customization.

14. A non-transitory computer-readable storage medium storing one or more instructions which, when executed by one or more processors, cause the one or more processors to perform:
receiving an infrared photograph of a tangible product having an imprinted markup on the product;
receiving a visible light photograph of the same product with the same imprinted markup, wherein the imprinted markup is visible in the visible light photograph but is not visible in the infrared photograph;
determining, based, in part, on the infrared photograph and visible light photograph, instructions for rendering a customization image of the product depicting a particular customization, wherein the particular customization is not in the infrared photograph or the visible light photograph;
wherein at least a portion of a shape and a shading of the customization image correspond to a shape and a shading of the imprinted markup.

15. The non-transitory computer-readable storage medium of claim 14, wherein the customization specifies one or more designs for imprinting on one or more design areas of the product or a color for at least a portion of the product.

16. The non-transitory computer-readable storage medium of claim 14, wherein the instructions cause the one or more processors to further perform:
determining the particular customization after determining the instructions for rendering the customization image and providing the particular customization as an input to the instructions for rendering the customization image.

17. The non-transitory computer-readable storage medium of claim 16, wherein the instructions cause the one or more processors to further perform:
receiving a customization specification specifying the particular customization;
causing performance of the instructions for rendering the customization image of the product depicting the particular customization;
causing display of the customization image of the product depicting the particular customization.

18. The non-transitory computer-readable storage medium of claim 14, wherein the instructions cause the one or more processors to further perform:
determining, based in part on the infrared photograph, luminance information;
determining, based in part on the visible light photograph, design geometry information;
wherein the instructions for rendering the customization image of the product are determined based in part on the luminance information and the design geometry information.

19. The non-transitory computer-readable storage medium of claim 18, wherein the instructions cause the one or more processors to further perform determining, automatically, based on the visible light photograph and the infrared photograph, a stored digital image of the product without markup;
wherein the instructions for rendering the customization image of the product are determined based in part on the image of the product without markup and the design geometry information.

20. The non-transitory computer-readable storage medium of claim 14, wherein the instructions cause the one or more processors to further perform:
performing a color segmentation process on an image based on the visible light photograph, resulting in a digitally stored color segmented image, wherein the instructions for rendering the customization image of the product are determined based, in part, on the color segmented image.

21. The non-transitory computer-readable storage medium of claim 14, wherein the instructions cause the one or more processors to further perform determining a normalized visible light image by removing luminance from an image based on the visible light photograph, wherein the instructions for rendering the customization image of the product are determined based, in part, on the normalized visible light image.

22. The non-transitory computer-readable storage medium of claim 14, wherein the instructions cause the one or more processors to further perform:
determining a first color-selected image and a second color-selected image based, at least in part on particular image, wherein the particular image is the visible light photograph or an image based on the visible light photograph, wherein the markup comprises a plurality of colors;
wherein, for each region of the particular image that is colored a first color of the plurality of colors, a same region of the first color-selected image is colored a particular color and remaining regions of the first color-selected image is colored a different color than the particular color;

wherein, for each region of the particular image that is colored a second color of the plurality of colors, a same region of the second color-selected image is colored the particular color and remaining regions of the first color-selected image is colored a different color than the particular color.

23. The non-transitory computer-readable storage medium of claim 22, wherein the instructions cause the one or more processors to further perform:

determining a design mask image based on the first color-selected image and the second color-selected image, wherein each region of the design mask image that is colored the particular color in either the first color-selected image or the second color-selected image is of a particular mask color in the design mask image and remaining portions of the design mask image are a different color than the particular mask color.

24. The non-transitory computer-readable storage medium of claim 22, wherein the instructions cause the one or more processors to further perform:

determining a grid image based on the first color-selected image and the second color-selected image wherein the grid image indicates locations at which one or more regions of the first color are adjacent to one or more regions of the second color in the particular image.

25. The non-transitory computer-readable storage medium of claim 14, wherein at least a portion of the instructions for rendering the customization image are associated with a particular viewpoint;

wherein the instructions cause the one or more processors to further perform:

receiving a customization specification specifying, at least in part, a customization associated with the particular viewpoint;

selecting, based on the customization specification, the portion of the instructions for rendering the customization image associated with the particular viewpoint for execution.

26. The non-transitory computer-readable storage medium of claim 14, wherein the product is a first product, the customization image is a first customization image, and wherein the instructions cause the one or more processors to further perform:

receiving a customization specification specifying the particular customization;

in response to the receiving the customization specification:

causing performance of the instructions for rendering the customization image of the product depicting the particular customization, wherein the particular customization is specified by the customization specification;

causing performance of second instructions for rendering a second customization images of a second product different from the first product depicting the particular customization;

causing display of the first customization image of the product depicting the particular customization and the second customization of the second product depicting the particular customization.

* * * * *